(12) United States Patent
Meyerzon et al.

(10) Patent No.: US 12,086,546 B2
(45) Date of Patent: *Sep. 10, 2024

(54) ENTERPRISE KNOWLEDGE GRAPHS USING ENTERPRISE NAMED ENTITY RECOGNITION

(71) Applicant: MICROSOFT TECHNOLOGY LICENSING, LLC, Redmond, WA (US)

(72) Inventors: Dmitriy Meyerzon, Bellevue, WA (US); Hui Li, Redmond, WA (US); Junyi Chai, Redmond, WA (US); Noura Farra, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 286 days.

This patent is subject to a terminal disclaimer.

(21) Appl. No.: 16/933,907

(22) Filed: Jul. 20, 2020

(65) Prior Publication Data

US 2022/0019740 A1 Jan. 20, 2022

(51) Int. Cl.
*G06F 40/295* (2020.01)
*G06F 16/31* (2019.01)
(Continued)

(52) U.S. Cl.
CPC .......... *G06F 40/295* (2020.01); *G06F 16/313* (2019.01); *G06F 16/906* (2019.01); *G06N 5/02* (2013.01); *G06F 40/205* (2020.01)

(58) Field of Classification Search
None
See application file for complete search history.

(56) References Cited

U.S. PATENT DOCUMENTS 8,594,996 B2 11/2013 Liang et al.
9,798,829 B1 * 10/2017 Baisley .............. G06F 16/9024
(Continued)

FOREIGN PATENT DOCUMENTS

CN 111950724 A * 11/2020 ......... G06F 21/6245

OTHER PUBLICATIONS

Dezhao Song, Frank Schilder, Shai Hertz, Giuseppe Saltini, Charese Smiley, Phani Nivarthi, Oren Hazai, Dudi Landau, Mike Zaharkin, Tom Zielund, Hugo Molina-Salgado, Chris Brew, and Dan Bennett; Building and Querying an Enterprise Knowledge Graph URL: https://ieeexplore.ieee.org/document/7947211 (Year: 2017).*

(Continued)

*Primary Examiner* — Richa Sonifrank
(74) *Attorney, Agent, or Firm* — Han Gim; Newport IP, LLC

(57) ABSTRACT

Examples described herein generally relate to a computer system including a knowledge graph storing a plurality of entities. A mining of a set of enterprise source documents within an enterprise intranet is performed, by an enterprise named entity recognition (ENER) model, to determine a plurality of entity names. An entity record is generated within a knowledge graph for a mined entity name from the linked entity names based on an entity schema and ones of the set of enterprise source documents associated with the mined entity name. The entity record includes attributes aggregated from the ones of the set of enterprise source documents associated with the mined entity name.

14 Claims, 16 Drawing Sheets

(51) Int. Cl.
  *G06F 16/906* (2019.01)
  *G06F 40/205* (2020.01)
  *G06N 5/02* (2023.01)

(56) References Cited

U.S. PATENT DOCUMENTS

| | | |
|---|---|---|
| 11,709,878 B2 | 7/2023 | Meyerzon et al. |
| 2014/0156567 A1* | 6/2014 | Scholtes .................. G06N 5/02 706/12 |
| 2015/0095303 A1 | 4/2015 | Sonmez et al. |
| 2015/0248222 A1 | 9/2015 | Poznanski et al. |
| 2018/0032636 A1 | 2/2018 | Mullaney et al. |
| 2019/0005118 A1* | 1/2019 | Tripathi ................ G06F 16/215 |
| 2019/0005395 A1 | 1/2019 | Dutkowski |
| 2019/0197442 A1 | 6/2019 | Lu |
| 2019/0278777 A1* | 9/2019 | Malik .................. G06F 16/9024 |
| 2019/0354544 A1 | 11/2019 | Hertz et al. |
| 2020/0097601 A1 | 3/2020 | Han et al. |
| 2020/0143102 A1* | 5/2020 | Ziraknejad ............ G06F 16/904 |
| 2020/0151560 A1 | 5/2020 | Song et al. |
| 2020/0394539 A1 | 12/2020 | Sethre et al. |
| 2021/0133216 A1 | 5/2021 | Meyerzon et al. |
| 2021/0357378 A1 | 11/2021 | Urdiales |
| 2022/0019579 A1 | 1/2022 | Meyerzon et al. |
| 2022/0019622 A1 | 1/2022 | Meyerzon et al. |
| 2022/0019905 A1 | 1/2022 | Meyerzon et al. |
| 2022/0019908 A1 | 1/2022 | Meyerzon et al. |

OTHER PUBLICATIONS

Dinesha, et al., "Enterprise Information Retrieval Using Collaborative Fusion and Active Feedback", In Proceedings of the 1st International Conference on Advanced Technologies in Intelligent Control, Environment, Computing & Communication Engineering, Mar. 19, 2019, pp. 68-74.

Furnas, et al., "Information Retrieval Using a Singular Value Decomposition Model of Latent Semantic Structure", In ACM SIGIR Forum, vol. 51, Issue 2, Jul. 2017, pp. 90-105.

Gao, et al., "Clustered SVD Strategies in Latent Semantic Indexing", In International Journal of Information Processing and Management, vol. 41, Issue 5, Sep. 1, 2005, pp. 1051-1063.

"International Search Report and Written Opinion Issued in PCT Application No. PCT/US2021/029259", Mailed Date: Aug. 2, 2021, 13 Pages.

"International Search Report and Written Opinion Issued in PCT Application No. PCT/US2021/029257", Mailed Date: Jul. 30, 2021, 12 Pages.

Ku, et al., "Building a PubMed Knowledge Graph", In Scientific Data, vol. 7, Article 205, Jun. 26, 2020, 15 Pages.

"Non Final Office Action Issued in U.S. Appl. No. 16/933,888", Mailed Date: Mar. 3, 2022, 28 Pages.

"Non Final Office Action Issued in U.S. Appl. No. 16/933,947", Mailed Date: Apr. 12, 2022, 15 Pages.

"International Search Report and Written Opinion Issued in PCT Application No. PCT/US21/034119", Mailed Date: Sep. 21, 2021, 10 Pages.

"International Search Report and Written Opinion Issued in PCT Application No. PCT/US21/034684", Mailed Date: Sep. 24, 2021, 9 Pages.

"International Search Report and Written Opinion Issued in PCT Application No. PCT/US21/030806", Mailed Date: Aug. 11, 2021, 13 Pages.

Schwabe, et al., "Trust and Privacy in Knowledge Graphs", In Companion Proceedings of the World Wide Web Conference, May 13, 2019, pp. 722-728.

"Named Entity Recognition & Bayesian Inference for Target Audience Projection", Retrieved From: https://medium.com/@datasciencemilan/named-entity-recognition-bayesian-inference-for-target-audience-projection-cfa77f46eae0, Oct. 20, 2019, 7 Pages.

Al-Moslmi, et al., "Named Entity Extraction for Knowledge Graphs: A Literature Overview", In Journal of IEEE Access, vol. 8, Feb. 14, 2020, pp. 32862-32881.

David, Robert, "Knowledge Graphs as a Service", Retrieved From: https://2019.semantics.cc/knowledge-graphs-service, Jul. 26, 2019, 4 Pages.

Duc, et al., "Extended Named Entity Recognition API and Its Applications in Language Education", In Proceedings of the 55th Annual Meeting of the Association for Computational Linguistics-System Demonstrations, Jul. 30, 2017, pp. 37-42.

Florez, et al., "Named Entity Recognition using Neural Networks for Clinical Notes", In Proceedings of Machine Learning Research, May 16, 2018, pp. 7-15.

Gui, et al., "Leveraging Document-Level Label Consistency for Named Entity Recognition", Retrieved from: http://www.qizhang.info/paper/IJCAI2020.Doc_NER.pdf, Retrieved Date: Jul. 10, 2020, 7 Pages.

Liu, et al., "HAMNER: Headword Amplified Multi-span Distantly Supervised Method for Domain Specific Named Entity Recognition", In Proceedings of The Thirty-Fourth AAAI Conference on Artificial Intelligence, Feb. 7, 2020, 8 Pages.

Masuch, Lukas, "Enterprise Knowledge Graph—One graph to connect them all", Retrieved From: https://www.managementexchange.com/hack/enterprise-knowledge-graph-one-graph-connect-them-all, Mar. 28, 2014, 5 Pages.

Peng, Cheng, "A Bert Based Relation Classfication Network for Inter-Personal Relationship Extraction", In China Conference on Knowledge Graph and Semantic Computing, Aug. 24, 2019, 7 Pages.

Song, et al., "Building and Querying an Enterprise Knowledge Graph", In Journal of IEEE Transactions on Services Computing, vol. 12, Issue 3, Jun. 13, 2017, 14 Pages.

Taher, et al., "Beheshti-NER: Persian Named Entity Recognition Using BERT", In Repository of arXiv:2003.08875v1, Mar. 19, 2020, 6 Pages.

Winn, et al., "Alexandria: Unsupervised High-Precision Knowledge Base Construction using a Probabilistic Program", In Proceedings of 1st Conference on Automated Knowledge Base Construction, May 20, 2019, 20 Pages.

Gianmario, et al., "Named Entity Recognition+Bayesian Inference for Target Audience Projection", Retrieved From: https://www.meetup.com/Data-Science-Milan/events/264951303/, Oct. 9, 2019, 5 Pages.

"Notice of Allowance Issued in U.S. Appl. No. 16/933,947", Mailed Date: Sep. 8, 2022, 8 Pages.

"Notice of Allowance Issued in U.S. Appl. No. 16/933,888", Mailed Date: Oct. 24, 2022, 15 Pages.

Final Office Action mailed on Apr. 11, 2024, in U.S. Appl. No. 16/933,930, 22 pages.

Final Office Action mailed on Feb. 15, 2024, in U.S. Appl. No. 16/933,959, 22 pages.

Non-Final Office Action mailed on Nov. 30, 2023, in U.S. Appl. No. 16/933,930, 22 pages.

Talwalkar, et al., "Large-scale SVD and manifold learning", Journal of Machine Learning Research, 2013, pp. 3129-3152.

"Non Final Office Action Issued In U.S. Appl. No. 16/933,959", Mailed Date: Oct. 5, 2023, 19 Pages.

Pedersen, et al., "Name Discrimination by Clustering Similar Contexts", In Proceedings of 6th International Conference on Intelligent Text Processing and Computational Linguistics, Feb. 13, 2005, pp. 226-237.

\* cited by examiner

ENTERPRISE KNOWLEDGE GRAPHS USING ENTERPRISE NAMED ENTITY RECOGNITION

BACKGROUND

Search engines require vast amounts of information and accumulated knowledge in order to respond to queries and organize basic information about various topics. Such a store of knowledge may be referred to as a knowledge graph or knowledge base and comprises facts about entities and relations between the entities. Forming knowledge graphs which are accurate, up-to-date, and complete remains a significant challenge.

A proprietary knowledge graph for an enterprise faces particular challenges in that the information to be stored in the knowledge graph may be particular to and confidential to the enterprise. Additionally, not all search and mining tools are specifically designed for the enterprise context.

The disclosure made herein is presented with respect to these and other technical challenges.

SUMMARY

Systems and methods are disclosed for enterprise knowledge graph mining using multiple toolkits and entity annotations with neural entity recognition. The use of multiple toolkits for an enterprise knowledge graph mining allows for more flexibility and coverage of information, as different technologies may tend to specialize on different types of entities based on the same source content (e.g., projects vs. companies vs. products vs. users, etc.). Technologies can also differ based on content sources. For example, user content may be detected from a user's OneDrive or emails. Toolkits can eventually be added that mine completely different sources of data, such as Yammer, Teams, emails, as well as external data, such as media Wikis and ServiceNow.

In various embodiments, multiple artificial intelligence (AI) toolkits may be implemented for mining enterprise knowledge graphs. Knowledge graph topics may be presented to users by annotating references to entities in rendered text by highlighting the references and rendering topic cards. The disclosed embodiments may utilize neural entity recognition stacks and incorporate the use of templates.

In one embodiment, mining of enterprise knowledge graphs using an enterprise named entity recognition (ENER) based model may be implemented. The ENER model may be based on Bidirectional Encoder Representations from Transformers (BERT) based deep neural network models that are adapted for neural entity recognition in text and then aggregating in semantic representation space. The ENER based model addresses at least several challenges arising from graphing enterprise domains. Enterprise documents can cover many different domains, for example finance, healthcare, and energy. Traditional Nnmed-entity recognition (NER) systems typically use training corpora mainly from publicly available news. For enterprises, the most interesting entity types are related to projects and teams, which are not likely to appear in public corpora. Traditional NER systems mainly focus on publicly available types such as people, locations, and organizations.

To address these challenges, the ENER based model provides:

1) generalization to different domains, and
2) identification of new entities from contextual information.

In one embodiment, topic extraction features may be implemented. In an embodiment, distant supervised learning may be applied using Wikipedia, and training may be divided into multiple stages. BERT has the capacity to learn extensive patterns and may be infused with syntactic and semantic language information. To leverage its capabilities, the ENER based model may use big data and divide the model training into multiple stages. By leveraging Satori knowledge graphing, Wikipedia data may be converted into NER training data. This may generate training corpora that is significantly improved for enterprise applications as compared to the traditional NER training corpus.

In the first stage, the ENER based model may be pretrained using the massive amount of Wikipedia data that covers various domains. In the second stage, the model may be tuned using collected data from enterprise documents in addition to existing NER training corpora from academic research.

The model may be trained on public data, and the test set may be constructed from enterprise internal documents, which contains many products and projects absent from public knowledge. This may allow for a more accurate data extraction in the enterprise context.

In an embodiment, topic building techniques may be implemented. The topic building techniques may include ranking topics and building relationships, and building the knowledge graph (linking, conflation, ranking, clustering) based on determined distance between topics and entities.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1A:
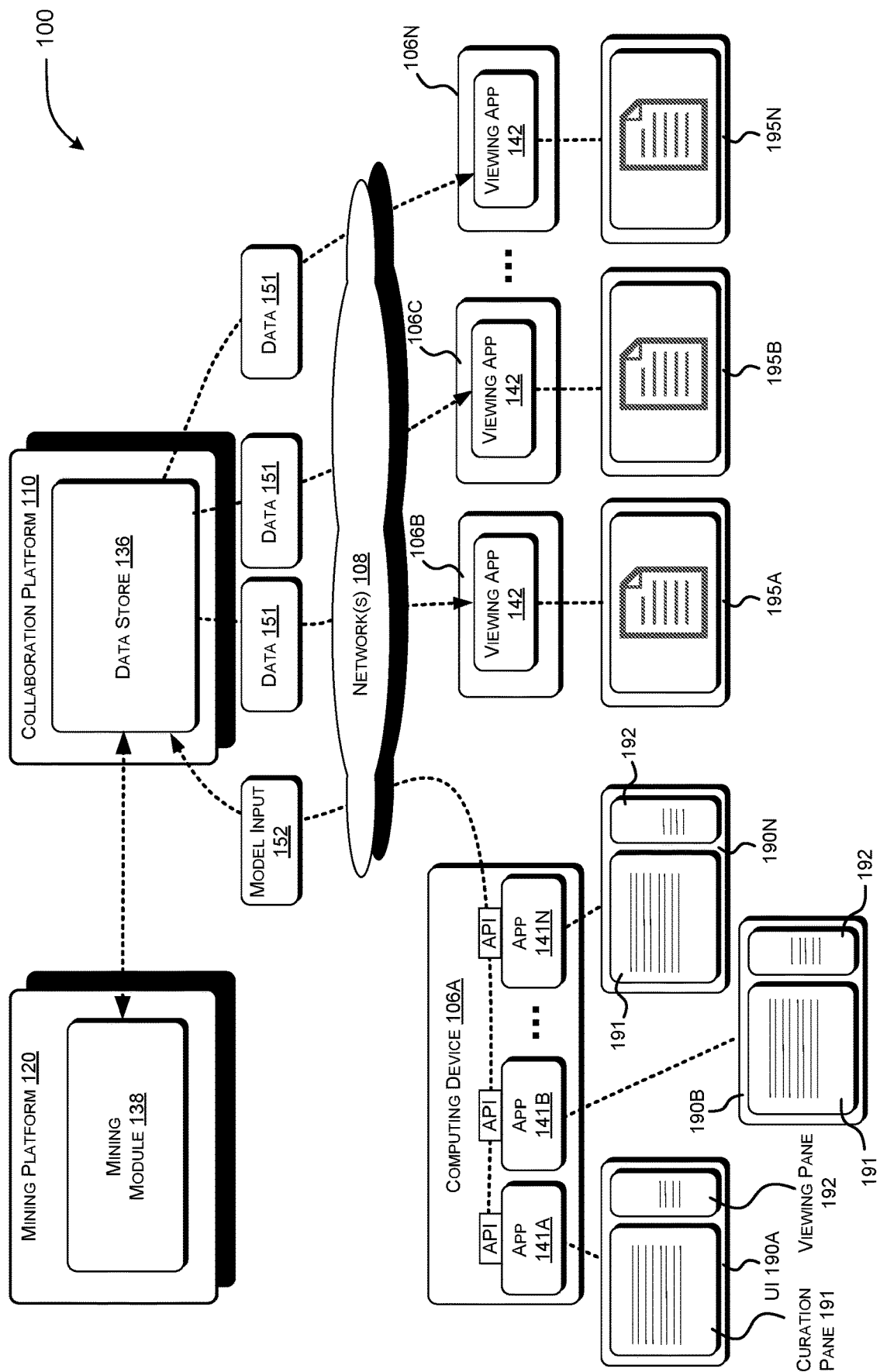
FIG. 1A illustrates a diagram illustrating a system for generation and of machine teaching models according to various embodiments.

The inability to access accurate knowledge graphs in an enterprise can be a barrier to enabling information sharing and productivity improvements. For example, users of an enterprise may wish to perform a project search or people search in order to find relevant information and topic experts for their projects. However, knowledge bases can be inaccurate due to the inability of current systems to accurately mine information in an enterprise, which may have unique vocabulary, private project names, and non-standard use of words and phrases that may yield unpredictable and inaccurate search results. At the same time, manually curated knowledge can require a significant amount of time and effort from users, which can be difficult to sustain. This can be a continuing cause of poor user experience using such systems in an enterprise setting. Furthermore, employees may spend hours searching for topics from multiple sources, resulting in inefficient use of time and human as well as computing resources.

These issues may broadly apply to a variety of industries where organizations and businesses may have productivity platforms that house domain specific knowledge. Additionally, individual enterprises may lack the resources to develop domain specific training data for such systems. Furthermore, the computing resources needed to process data in some enterprises may be significant, especially when the enterprise holds large amounts of data.

The present disclosure provides systems and methods for generating, maintaining, and using a knowledge graph for an enterprise using multiple mining methods and systems, which may be referred to herein as toolkits. In an embodiment, a computer system, e.g., a local or remote server, may run a plurality of toolkits to mine data and use one or more linking/merging functions to generate an enterprise knowledge graph based on enterprise source documents accessible via a network such as an intranet. In an embodiment, a system that runs multiple toolkits and links/merges the outputs of the toolkits, as well as perform related functionality such as annotations and curation, may be referred to herein as multi-toolkit enterprise mining system.

The multi-toolkit enterprise mining system may perform mining of enterprise source data, such as documents, emails, and other files for entity names such as project names, organization names, product names, etc. The mining may include comparing enterprise source documents within an enterprise intranet to a plurality of templates defining potential entity attributes to identify extracts of the enterprise source documents matching at least one of the templates or using ENER to detect patterns that match entity references in the language model. Each toolkit may focus on different aspects of available data as well as relationships between data and users of the data. As used herein, "entity" may be used interchangeably with "topic."

In some embodiments, a toolkit may parse an extract according to one or more templates that match the extracts to determine instances. The multi-toolkit enterprise mining system may perform methods such as clustering or other types of aggregation on a number of the instances to determine potential entity names. The names may be unique to the enterprise such that external sources of the entity names are not available. Accordingly, when the multi-toolkit enterprise mining system observes multiple instances of a name being used in documents, there may be a level of uncertainty as to whether the name is the correct name for an entity, or whether the name refers to different entities. In various embodiments, the present disclosure may use methods such as a clustering process to evaluate the uncertainty associated with instances and determine a probable name, which is referred herein to as a mined entity name.

In some embodiments, the multi-toolkit enterprise mining system may generate an entity record for at least one of the mined entity names based on a schema for the entity. The entity record may include attributes aggregated from the enterprise source documents associated with the mined entity name. The entity record may be stored in the knowledge graph. In an embodiment, a user within the enterprise that is associated with the entity record and has permissions to edit the entity can optionally perform a curation action on the entity record, and the multi-toolkit enterprise mining system can update the entity record based on the curation action. Accordingly, as the knowledge graph is accessed and curated by users, the knowledge graph may develop into a combination of machine-learned knowledge and user curated knowledge. The multi-toolkit enterprise mining system may display an entity page including at least a portion of the attributes of the entity record to other users based on permissions of each user to view the enterprise source documents. Accordingly, users within the enterprise may easily access information about the enterprise according to permissions of the underlying source documents.

The multi-toolkit enterprise mining system thus performs knowledge graph mining using multiple toolkits, and may further generate entity annotations with neural entity recognition. The use of multiple toolkits allows for more flexibility and coverage, as different technologies implemented by the toolkits may tend to specialize on different types of entities (e.g., projects vs. companies, products vs. users, etc.) or cover different data sources.

In an embodiment, multiple AI toolkits are implemented for mining enterprise knowledge graphs. Knowledge graph topics may be presented to users by annotating references to entities in text by highlighting the references and rendering topic cards. The disclosed embodiments may utilize neural entity recognition stacks and incorporate the use of templates.

In one embodiment, mining of enterprise knowledge graphs may be implemented using an enterprise neural entity recognizer (ENER) based model. The ENER toolkit may use transfer learning from the web to achieve greater efficiencies and coverage than developing a single model per tenant. As further detailed herein, the ENER toolkit may provide highlighting, topic mining, and topic card (knowledge graph) building. The ENER toolkit may be based on BERT based deep neural network models that are adapted for neural entity pattern recognition in text and then aggregating in semantic representation space.

The multi-toolkit enterprise mining system may further provide topic ranking and aggregate topics extracted from each document and provide a tenant-wide view. The multi-toolkit enterprise mining system may consider topic popularity and trending topics.

The multi-toolkit enterprise mining system may analyze metadata such as organization information. A knowledge graph building function of the multi-toolkit enterprise mining system may perform topic conflation, latent semantic embedding and relationship ranking, and topic card generation. The multi-toolkit enterprise mining system may support full batch mode and incremental batch mode which is further discussed herein.

In one embodiment, mining of enterprise knowledge graphs using natural language-based models may be implemented. The models may identify topics from various documents such as user emails using natural language processing (part of speech, noun phrases, key phrases and other features), and then aggregate across multiple users in the tenant. For example, topics may be identified and aggregated across user email mailboxes or data platforms such as OneDrive. As described herein, the natural language-based models may be collectively referred to herein as a user-based mining system or toolkit.

In one embodiment, systems and methods for linking/merging entities across multiple sources may be implemented. As discussed herein, such as system may be referred to herein as a multiple toolkit linking system. In some embodiments, the multiple toolkit linking system may implement Bayesian inference techniques. As further described below, the multiple toolkit linking system may be configured to link and conflate topics from multiple sources (e.g., the toolkits described herein), as well as other sources. Topics from the multiple sources may be analyzed to determine which topics are the same and which topics should be treated as a distinct topic. Source metadata may be used to add detail to a topic's description. In this way, definitions and acronyms, for example, can be identified and properly linked to other ways of referencing the same topic. For example, emails can connect different users who are engaged with a common project. Examples of metadata that may be used for linking topics may include common users, users working with each other closely, common sites for linked files, common hubs of sites, etc.

In one embodiment, systems and methods may be implemented for knowledge graph entity annotations via pattern recognition using the Enterprise Named Entity Recognition (ENER) system. Such a system may be referred to herein as an annotations function. Accuracy in annotations may be improved by starting with ENER pattern recognition. The ENER pattern recognition provides candidate patterns that may be estimated to be name entity references by inspecting document text. The candidate entities may then be cross-referenced with the knowledge graph for higher accuracy. In addition, ambiguous entities may be resolved during this process by taking into account the context of the user, including the user's reporting hierarchy (common with the topic), other users that the user is working with in the enterprise, common data platform (e.g., SharePoint) sites and hubs, and the like. This approach may allow for removal of noisy annotations that may be generated by only relying on one type of mining tool such as templates. Since toolkits generally do not achieve complete accuracy of topics in the knowledge graph, there is typically inherent noise in the knowledge base. ENER based annotations may allow for the reduction of noise amplification in annotations.

Multiple Toolkit Linking System

The multiple toolkit linking system is related to knowledge graph mining and entity annotations with neural entity recognition. The multiple toolkit linking system provides linking/merging of entities across multiple sources based on the use of multiple AI toolkits for mining enterprise knowledge graphs. In an embodiment, the inputs can be from at least three different toolkits as described herein. Knowledge graph topics may then be surfaced to users by annotating references to entities in rendered text by highlighting the references and rendering topic cards.

The linking and aggregation process may include receiving or accessing topics, or entities, which may include metadata, such as people, files, sites, definitions, acronyms, and one or more names, from each toolkit and determining a larger scope of linking based on identified names and associated metadata. For example, outputs can be combined from one project with another based on linking between users based on organizational hierarchy, users working with one another (which may be determined based on the users attending common meetings, frequently emailing or otherwise communicating with each other, belonging to common groups, etc.), files being stored in common sites or sites that belong to common hubs. An analysis of the names can determine whether topics can be linked. In many cases, names may be reused for different purposes between groups within an organization.

Each toolkit may identify topics as a set of properties with associated users and stored as a topic data item. In some embodiments, a probability distribution may be calculated for each topic data item.

Each toolkit may determine relevant properties for a topic using their respective techniques. Examples include relationships between topics and between topics and project, companies, users who are authorized to view a given property, and the like. The properties may be captured in metadata, which can be used to link topics together. In an embodiment, each entity and relation type can have a set of properties. In one example, a property can be "relationtype"=name. Additionally, each may have a weight and a secured resources property to indicate which users may be allowed to view each property value. Properties can have multiple values, and each value can be secured independently. Relationships can be broad, but some are well known relationships, such as names, related people, related documents, related sites, and related topics. Only known relationships can be used for linking.

Related users, sites, and entities typically have access to common documents and thus may be identified based on common documents. User relationships is one characteristic that may be used to determine topic relationships. User relationships may be indicated by discovered properties such as coauthored documents, email exchanges, participation in the same meetings, etc. Thus if it is determined that two users are related and both users are determined to be associated with projects that have the same name, then it may be determined that the project is the same. Common documents and overlapping users may thus be useful indicators of common projects. In one embodiment, sites may be organized into hubs and then related based on the discovered properties. Probabilities may be used to infer that topics are related.

In some embodiments, user curation may be implemented to build topics based on user input. For example, when viewing a page or document, users may be provided the capability to specify or create a topic out of the currently active page or document. In this way, topics that are mined/generated by the multi-toolkit enterprise mining system can be augmented or corrected by the users of the system.

With a list of topics that have been mined, for any page that is viewed by a user, the text of the page may be sent to a corresponding toolkit that identifies a list of candidates that could be potential topics. The toolkit may match the mined topics to the identified potential topics. Matched topics may be surfaced to the display when activated, for example, by hovering over the corresponding text in the document.

In some embodiments, template matching may be used to generate a list of topics. The use of neural entities can increase accuracy and reduce noise in the results. For example, some entities can be noisy due to their broad use in a number of contexts. In some embodiments, cross-referencing may be used to increase accuracy of matches, which can increase the number of active topics on a page or document. Additionally, disambiguation may be performed if entities re-use the same name.

Annotations Function

The annotations function be applied to word documents, web pages, emails, and the like. In an embodiment, when an entity name is ambiguous (e.g., the name could be associated with multiple projects), the annotations function may use the context of the page to determine which project should be linked. For example, the annotations function may use the author of the page, the site that the entity name is on, other users who the user worked with, other users listed on the page, and so forth. For example, to resolve multiple uses of the same name, one or more linking techniques can be applied, such as identifying associated users to determine links.

The annotations function may associate multiple names to refer to the same topic. For example, the full name of a project as well as its acronym may be identified and used to refer to the same project. One or more variations in the names may also be linked even when the variations are not an exact match. For example, substrings of the full string for a name may be linked if there is sufficient similarity between the substring and the full string. Higher weights may be assigned to longer substrings.

In an embodiment, for user curation a user may be allowed to create a type of page using one or more data fields such as. EntityId—this can have the corresponding mined ID at the time of curation. The actual ID may change as mining progress as few entities are added (e.g., merging). An additional index in the topics knowledge base may be used to maintain mapping between all current and previously mined IDs to an ID of the actual mined ID which we will generate a topic card after clustering. In some embodiments, curated entities can be updated with an up-to-date mined ID directly into the topics knowledge base.

EntityType—entities can have multiple types e.g., project and team. In an embodiment, separate pages for each type may be created with different templates

Entity Relations

Additionally, a user may be provided the capability to customize particular properties and relations of a topic: definition, acronyms, related people, related documents, related sites, related entities.

There are two typical scenarios in which topics can be curated:

From an existing mined entity—this can include creating a new curated page but linking it to an existing mined entity before publishing.

Creating a curated page from scratch without linking to an existing mined entity. In this case a new mined entity ID can be created which can be used later at clustering time to create an empty ExternalEntity with just a name.

Curated topic pages may have their own access control list (ACL). Only users who have access to the topic page can see curated topics. Values such as Name, Definition, RelatedPeople may protected by an ACL of the curated page itself. RelatedDocuments, RelatedPeople, RelatedEntities may be protected by their own ACLs as well in addition to an ACL of a topic page.

A knowledge base state contains an internal representation of the knowledge graph, including all established and unestablished entities, and intermediate statistical information about the entity and its attributes. ExternalEntities in the knowledge base state may have a list of corresponding curated resources in a property bag—curated topics, taxonomy term IDs, and other IDs to external knowledge bases. Each curated page may be referenced by one or more ExternalEntity. If ExternalEntity does not exist for a newly curated page, a new ExternalEntity may be created at clustering with name and relations/signals and may be fed into the clustering pipeline. At the end of the clustering, entities may be generated for mined entities only and written into the knowledge base state. Established mined entities may be written into the topics knowledge base to make them available for querying.

Some embodiments may implement two types of items in the knowledge base: curated and mined. Curated items may reference the mined entity by the ID at the time of curation. Mined entities may have a list of tracking IDs to track merging evolution over the time. In order to find the current mined ID for a curated page, an additional index may be implemented which maps tracking IDs into mined IDs.

When topics are requested by name, the curation function may return the best curated page (if any), including mined data and properties if other curations exist. In one embodiment, the view counts of curated pages may be used to rank results. If no curations exist, the mined topic card can be returned. In an embodiment, all mined cards may be merged that match by name or alternative name.

When topics are requested by ID, the curated or mined data may be requested. Tracking ID mappings may be used if applied. Tracking IDs may include the original topic ID from the corresponding toolkit, or curated IDs. Entities can be merged as more evidence is collected and fed into the system, but tracking IDs will preserve the original IDs, which allows the knowledge base to be updated subsequently. For example, a topic page edit/view may request only mined data as other resources may already be available on the page itself. As another example, data may be served form the knowledge base by CuratedId. In this case all modifications to the topics knowledge base to the corresponding item by any other APIs or inputs may be automatically available on a topic page.

The knowledge base may be implemented as an internal structure to support incremental clustering operations and linking between mined and external content like curated pages. The knowledge base state content may be a set of ExternalEntities which may include EntityId, list of names and alternative names, list of evidences (references to documents which they were extracted from), and an additional property bag to pass through any auxiliary information to support, for example, curation and tracking links to curated topics.

During the clustering process, a list of queries may be generated based on the data in the current batch which may include queries by Name/AlternativeName, DocIds (to support deleted documents/evidence), and CuratedIds (to support operations on curated pages).

Mining Enterprise Knowledge Graphs Using Enterprise Named Entity Recognition (ENER) System In various embodiments, an enterprise mining system, which may be referred to herein as the ENER system, is disclosed that provides a toolkit for mining enterprise knowledge graphs. The ENER system may initially use Bidirectional Encoder Representations from Transformers (BERT) based deep neural network models that were adapted for neural entity recognition in text and aggregation in semantic representation space. The output may be provided standalone or input to a process for linking and merging of entities across multiple sources. The ENER system can be used to mine documents, emails, and other various data sources, and leverage a deep learning model to identify and extract topics from the data sources. The ENER system can be leveraged to provide tenant level ranking to identify the most relevant and popular/trending topics for a given tenant and build a knowledge graph for each tenant.

The ENER system solves two challenges arising from graphing enterprise domains:

Enterprise documents can cover many different domains, for example finance, healthcare, and energy. Traditional NER systems use training corpora mainly from publicly available news.

For enterprises, the most interesting entity types are related to products and projects, which are not likely to appear in public corpora. Traditional NER systems mainly focus on publicly available types such as people, locations, and organizations.

To address these two challenges, the ENER system provides:

1) generalization to different domains and
2) identification of new entities from contextual information.

In one embodiment of the ENER system, the ENER system may perform topic extraction using distant supervised learning using Wikipedia; and dividing the training into multiple stages.

The ENER system may use the deep neural network NLP model BERT, which has the capacity to learn patterns and is already infused with syntactic and semantic language information. To leverage its capabilities, the ENER system uses big data while dividing the model training into multiple stages. By leveraging Satori knowledge graphing, Wikipedia data is converted into NER training data. This generates a training corpus that is significantly larger than the traditional NER training corpus.

In an embodiment, the ENER system is adapted by training using distant supervised learning with Wikipedia data. In the first stage, the model is pretrained using Wikipedia, which contains a large amount of data that covers a number of domains. In the second stage, the model is tuned using collected data from enterprise documents in addition to existing NER training corpora from academic research. The model is trained on public data, and the test set is constructed from enterprise internal documents, which contains many products and projects absent from public knowledge. This allows for a more accurate data extraction in the enterprise context.

In an embodiment, a singular value decomposition (SVD) algorithm may be leveraged to improve discovery of user relationships based on documents and topic vectors. SVD may be used for sematic embedding to predict different entities into one space, calculate the distance between entities, and calculate vectors to develop topic cards. The topic cards may be used to find related documents, users, groups, and related topics.

SVD may be used to build up relationships for a substantial number of entities. However, when analyzing platforms that may grow to millions of documents with many thousands of topics, the amount of memory and processing required will not be scalable. In some embodiments, memory and processing requirements may be reduced by implementing a streaming SVD technique wherein the coherence matrices may be divided into smaller matrices and modified vectors are used.

In a further embodiment, the training stage may be separated into multiple stages. Furthermore, the loss function may be customized with augmentation technologies as further disclosed herein.

User-Based Mining System

In an embodiment, a user-based mining system may be implemented to mine enterprise information. The user-based mining system may be used to identify enterprise topics that are trending and active based on users and user activity. In one embodiment, the user-based mining system may analyze information for a plurality of users in an organization, such as information from meetings, emails, documents, and other sources, and infer topics for which each user may have knowledge. The inferred information may be aggregated at the tenant level and combined to provide inputs to the knowledge graph.

In an embodiment, an aggregation process may perform the following:
Remove duplicated topics
Common topics are identified and clustered
Topics are scoped to a user
Topics that are not found at the user level but can be accessed based on content permissions are made available to the user
Topics may be incrementally update as user level topics may change with time
Acronyms, definitions, related documents, related people properties are available with determined scope and relevance.

The process may be iteratively improved as more features are made available.

Specific information for various users may include, for example, content of emails, including words, phrases, names, acronyms, descriptions, related documents, related people properties, metadata (if available) and the like. The user-based mining system may determine usage information for the content items. For example, for key phrases, the user-based mining system may determine how often a user discusses the key phrases, whether the user is discussing the key phrases with known colleagues, and the like. The user-based mining system may further identify documents authored by each user and documents edited by each user. The user-based mining system may thus identify topics of importance for users in an organization.

When the user-based mining system identifies an acronym, the system may determine if the acronym is an alternate name for an existing topic, and access the knowledge graph to determine which users are associated with a topic. In one embodiment, acronyms may be associated at the user level with a name matching scheme. If a topic appears in the acronym expansion, the acronym is associated with the topic as one of the possible acronyms. An acronym may carry the set of source documents where it is extracted from, and given that the number of topics at the user level is small (e.g., ~10), the acronym may be associated with a name match and source document match. Additional processes can be added iteratively. A similar process can be implemented for descriptions and definitions.

The user-based mining system may continue to accumulate data in a single space and aggregate and merge information. The user-based mining system may use numeric features of topics, such as how often a user discusses a topic, whether a user appears in titles, emails, and documents, how many others the user communicates with, and the like. The user-based mining system may further calculate the mean and maximum values across users. A classification layer may be executed to make a determination as to whether to classify an item as a topic.

When available, the associated metadata may be used to find documents and features. The user-based mining system may determine relative ranks and static scores, and merge and rank documents. The user-based mining system may identify related users by topics, and related topics by users. The user-based mining system may analyze associated evidence with each item, such as access control lists, version histories, users who have authored and edited documents, for example. Such information may provide further evidence for relationships between users.

A user-based state may be maintained on a periodic basis during which new information such as meetings, emails, and new documents can be analyzed to update the state. In one embodiment, the state may be persisted at the aggregation layer. The user-based state may be persisted with current and past data. In some embodiments, items from the past (and not active at a current time) may be phased out. Older items may be phased out based on a staleness factor that may be determined based on time. For example, a topic that has not been discussed for a predetermined time period such as 30 days may be considered stale and removed as a topic. In other examples, topics may be considered stale based on additional factors such as if it is determined that users who are associated with the topic have moved out of the organization or are otherwise not involved with the topic.

In some embodiments, the user-based state may be updated based on a feedback loop that may include evaluations, curations, added or removed information, feedback received on an aggregation site (e.g., a user has added/removed content), a user level site indicating an additional indication as to whether a topic is associated with a user, or any other means to update information and to correct errors.

In some embodiments, the knowledge base may provide a mechanism to invite users to edit information that is currently captured in the knowledge base. The user-based mining system may be used to identify users who have a likelihood of being involved with a topic or has knowledge about a topic and whose input may be targeted for curation of the topic. Targeted curation may be useful to confirm the contents of the knowledge base by intelligent sampling of users who are likely to have useful input and for topics for which updated information is desired. In some embodiments, the targeted curation function may use the various inputs described and determine if a topic should be updated and if so, which users may provide relevant input. The targeted curation function may be useful to provide validation of mined topics, reduce uncertainty of the mined information, and to confirm staleness of a topic, among other things.

More generally, that each toolkit may provide a targeted curation interface for the topics that it mines to enable topic linking and conflation across toolkits. Each toolkit may have a topic with a toolkit specific identifier that can be tracked, a collection of names, related files, people, sites and related topics, and a set of underlying files that can be used to secure each piece of topic metadata. This may be referred to as TopicDataItem.

For tenant-wide topic processing, a clustering process may be executed for the topics that are generated at the user level. An output of the clustering processing may be a set of tenant topics. In one embodiment, if two topics are the same, the following rules can be applied.

Use the acronym and definition strings
Use people reported topics to derive similarity
Use people interactions
Use entity representations
Use the interaction graph embeddings from each shard
Additional techniques such as machine learning can be used to further adapt the process.

Enterprise Mining Techniques

One issue with using a method such as a clustering process to resolve uncertainty is that application of the method may become infeasible given finite computing resources and a large number of source documents. As more documents are added, the method may consume a disproportionate amount of computing resources including memory and processor cycles, thus making the method unscalable as the number of documents continue to increase. For example, with a large number of documents, a complete clustering process over the set of documents may not be completed before additional documents are added that need to be analyzed. The algorithm may also be non-linear with respect to the number of documents.

In some embodiments, the present disclosure includes implementations that include performing the clustering process incrementally on a limited number of instances in order to reduce the use of computing resources. The limited number of instances can be configured to improve feasibility and/or speed of the clustering process.

Incremental clustering can also be used to update an existing knowledge graph based on new source documents without having to mine the full set of source documents. Incremental clustering may include comparing enterprise source documents within an enterprise intranet to a plurality of templates defining potential entity attributes to identify extracts of the enterprise source documents matching at least one of the plurality of templates. The disclosed mining systems may parse the extracts according to respective templates of the plurality of templates that match the extracts to determine instances. The disclosed mining systems may perform clustering on a number of the instances to determine potential entity names. The disclosed mining systems may then query the knowledge graph with the potential entity names to obtain a set of candidate entity records. The incremental clustering may include linking the potential entity names with at least partial matching ones of the set of candidate entity records to define updated matching candidate entity records including attributes corresponding to instances associated with the potential entity names. The disclosed mining systems may update the knowledge graph with the updated matching candidate entity records and with new entity records for unmatched potential entity names, wherein the unmatched potential entity names are defined by ones of the potential entity names that do not match with any of the set of candidate entity records.

In some embodiments, the present disclosure includes implementations that annotate a document with a link to the knowledge graph. For example, words corresponding to an entity name may be highlighted and/or linked to the knowledge graph. An annotated document allows a user to easily obtain information about entities via the link within the document. For example, a user reading a document who encounters a project name for the first time may follow the link to an entity card for the project entity and obtain information about the project entity within the application used for viewing the document. The user's experience with an annotated document may depend on the accuracy of the annotations. A naïve annotation may annotate words that do not refer to an entity, or may link to an incorrect entity. The disclosed mining systems may use filters and linking to improve the accuracy of selecting words to annotate. The system may also apply permission to the selected words to ensure the user is permitted to view information about the entity.

FIG. 1A illustrates a system 100 for enabling the generation, storage, and updating of a knowledge base. In some embodiments, updating or creation of a knowledge base may be enabled within a contextual environment of an application such as a word processing application. In other embodiments, the updating or creation of a knowledge base may be enabled using a separate user interface application. Either embodiment may be illustrated by application 141 in this example. A user can interact with an application 141 to create and edit documents, and view and add or edit content that may be a particular type of file, e.g., a word processing document, a spreadsheet document, etc. The applications 141 may each be configured to display a curation pane 191 and a viewing pane 192. The content of a model may be displayed in the curation pane 191. A user can select portions of content displayed in the curation pane 191. The selected portions can be selected as inputs in a viewing pane 192. The viewing pane 192 may also be used to view available files for selection and insertion into the knowledge base.

The content in the viewing pane 192 can be used to generate knowledge base input 152. In some configurations, the knowledge base input 152 can be in the form of a text strings, table, file, an image file, a video file, or any other suitable format. Collaboration platform 110 and mining platform 120 can interact to identify and classify content based on the implemented toolkits. Although collaboration platform 110 and mining platform 120 are shown as two platforms, collaboration platform 110 and mining platform 120 may be implemented as a shared platform. For example, mining platform 120 can be part of collaboration platform 110 and vice versa.

Model input 152 can include text, images, media or any other form of data. The model input 152 can include data that is stored within a data store 136 and managed by teaching platform 120 comprising a teaching module 138.

Data 151 can be communicated to any number of computing devices 106, referred to herein as computing devices 106B-106N, from a first computing device 106A or the service 110 via a network 108. Each computing device 106B-106N associated with a recipient can display the data 151 on a user interface 195 (195A-195N) by the use of a viewing application 142. The viewing application 142 can be any suitable application such as a presentation program, a web browser, a media player, etc. The viewing application 142 may also be a web-based application.

It should be appreciated that the subject matter described herein may be implemented as a computer-controlled apparatus, a computer process, a computing system, or as an article of manufacture such as a computer-readable storage medium. Among many other benefits, the techniques shown herein improve efficiencies with respect to a wide range of computing resources. For instance, human interaction with a device may be improved, as the use of the techniques disclosed herein enable a user to view and edit model input data from a wide range of file types while operating in one application. In addition, improved human interaction improves other computing resources such as processor and network resources, e.g., users can work from a reduced number of applications and reduce a user's computer interaction, reduce the chances of an inadvertent input, reduce network traffic, and reduce computational cycles. The techniques disclosed herein reduce the need to download, start, maintain updates for, and toggle between, a number of applications, including a specialized presentation program. Also, instead of requiring the input of machine learning experts, useful machine learning applications can be generated using the abstract user interface by users of the data. Other technical effects other than those mentioned herein can also be realized from implementations of the technologies disclosed herein.

The collaboration platform 110 may enable the devices 106 to share documents and collaborate on the documents. As described herein, the term "user" may refer to a computing device that is equipped with communication and computing capability. The term "document" may be any type of media, such as text documents, that is capable of being rendered on a computing device. A document may be a computer file that is capable of being produced by, edited, or viewed using a productivity program or suite. In addition to enabling users to collaborate and share documents, the collaboration platform 110 may provide users with file systems or organizational structures to manage the documents. The collaboration platform 110 may include a task management and workflow service as well as other services not illustrated in FIG. 1A.

The collaboration platform 110 may require authorization or user authentication before granting access to the resources of the collaboration platform 110. The collaboration platform 110 may enable users to execute applications or tasks, track and manage the execution of the applications or tasks, and receive the results of the execution. The collaboration platform 110 may enable and manage the execution and processing of documents for collaboration between one or more users in a distributed system. The collaboration platform 110 may, for example, enable uploading documents and retain and modify metadata associated with the documents. The collaboration platform 110 may further allow for search functions associated with the documents or their metadata as well as collaborations between users on the documents.

The data store 136 may be a collection of computing resources configured to process requests to store and/or access data. The data store 136 may operate using computing resources (e.g., databases) that enable the data store 136 to locate and retrieve data so as to allow data to be provided in response to requests for the data. Data stored in the data store 136 may be organized into data objects. The data store 136 may store any type of document (for example, document source files), extracted document text, and the like.

The UI 190 may be configured to allow the creation and editing of models as described herein. The UI 190 may enable the user (not shown) to view and edit model input 152 for a selected model. In some embodiments, UI 190 may communicate via API function calls.

The teaching platform 120 may be a collection of computing devices and other resources collectively configured to enable creation and editing of models. Models may be generated by creating a library or associating an existing library.

The application 141 may be implemented by executable instructions (for example, that are stored on a non-transitory computer-readable storage medium on the computing device 106 or coupled to the computing device 106) that, when executed by the computing device 106, enable user interaction with the UI 190. A user may also interact collaboration platform by, for example, uploading a document to one or more libraries, opening a document from one or more libraries, and editing or annotating a document.

In one embodiment, mining platform 120 may be configured to manage and store one or more knowledge bases. The mining platform 120 may be remotely implemented such as on a server, or may be implemented on one or more devices. The UI 190 may read and/or write data to the mining platform 120 over a network 108. APIs may also be exposed to allow users to request or retrieve relevant data, such as those that the users have access to or are engaged with because of a shared task or project.

Figure 1B:
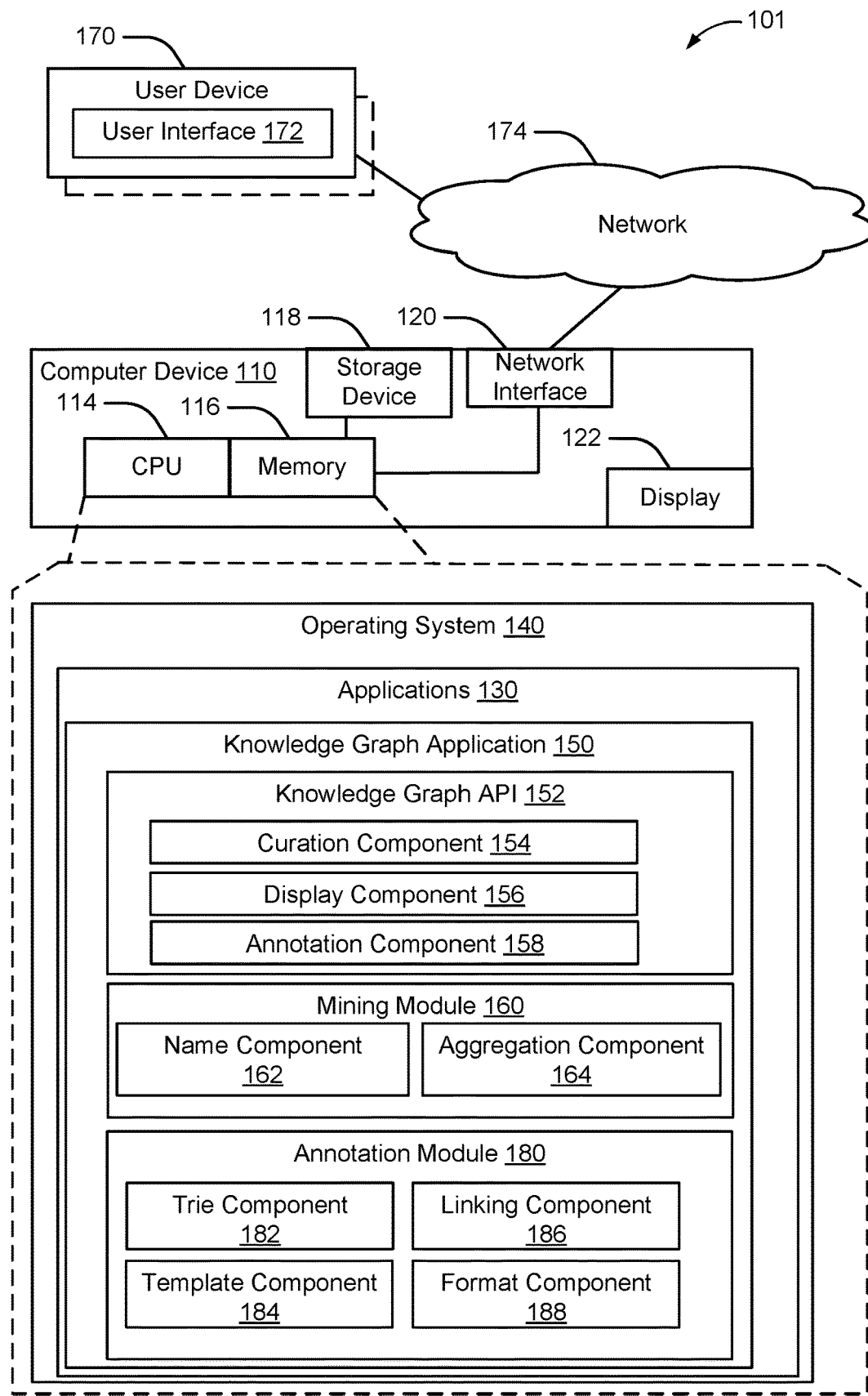
FIG. 1B is a schematic block diagram of an example system for generating, updating, and accessing a knowledge graph, in accordance with an implementation of the present disclosure.

Referring now to FIG. 1B, another example knowledge graph system 101 includes a central computer device 110 and a plurality of user devices 170. The central computer device 110 may be, for example, a mobile or fixed computer device including but not limited to a computer server, desktop or laptop or tablet computer, a smartphone, a personal digital assistant (PDA), a handheld device, any other computer device having wired and/or wireless connection capability with one or more other devices, or any other type of computerized device capable of processing user interface data.

The computer device 110 may include a central processing unit (CPU) 114 that executes instructions stored in memory 116. For example, the CPU 114 may execute an operating system 140 and one or more applications 130, which may include a knowledge graph application 150. The computer device 110 may also include a network interface 120 for communication with external devices via a network 174, which may be an enterprise intranet. For example, the computer device 110 may communicate with a plurality of user devices 170.

The computer device 110 may include a display 122. The display 122 may be, for example, a computer monitor or a touch-screen. The display 122 may provide information to an operator and allow the operator to configure the computer device 110.

Memory 116 may be configured for storing data and/or computer-executable instructions defining and/or associated with an operating system 140 and/or applications 130, and CPU 114 may execute operating system 140 and/or applications 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In an implementation, the computer device 110 may include a storage device 118, which may be a non-volatile memory.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads.

The operating system 140 may include instructions (such as applications 130) stored in memory 116 and executable by the CPU 114. The applications 130 may include knowledge graph application 150 configured to generate, manage, and display a knowledge graph storing information regarding an enterprise. The knowledge graph application 150 includes a knowledge graph API 152 that allows a user device 170 or an application executing on a user device 170 to access specific functions of the knowledge graph application 150. For example, the knowledge graph API 152 includes a curation component 154 that receives curation actions from a user. As another example, the knowledge graph API 152 includes a display component 156 that displays at least a portion of an entity page stored in the knowledge graph to a user. As another example, the knowledge graph API 152 includes an annotation component 158 that receives requests to annotate a document viewed by a user, for example, from the user interface 172 on a user device 170.

The knowledge graph application 150 includes a mining module 160 that generates and updates entity records to be stored in the knowledge graph. The mining module 160 includes a name component 162 that mines enterprise source documents for candidate patterns that may be determined as entity names and other entity metadata. The mining module 160 includes an aggregation component 164 that aggregates information from the enterprise source documents to generate entity records for entity names mined from the enterprise source documents. The other entity metadata may include people relations, document relations, and dates.

The knowledge graph application 150 includes an annotation module 180 that annotates a document. The annotation module 180 may include a trie component 182 that generates a trie of entity names or patterns containing the entity names and applies a document or extracts therefrom to the trie to determine potential entity names. The annotation module 180 may include a template component 184 that matches the document against entity templates to identify extracts from the document that are likely to include entity names. The annotation module 180 may include a linking component 186 that attempts to link metadata for potential entity names within the document to entity records within the knowledge graph. The annotation module 180 may include a format component 188 that filters potential entity names based on formatting within the document to select instances of potential entity names to annotate.

Figure 2:
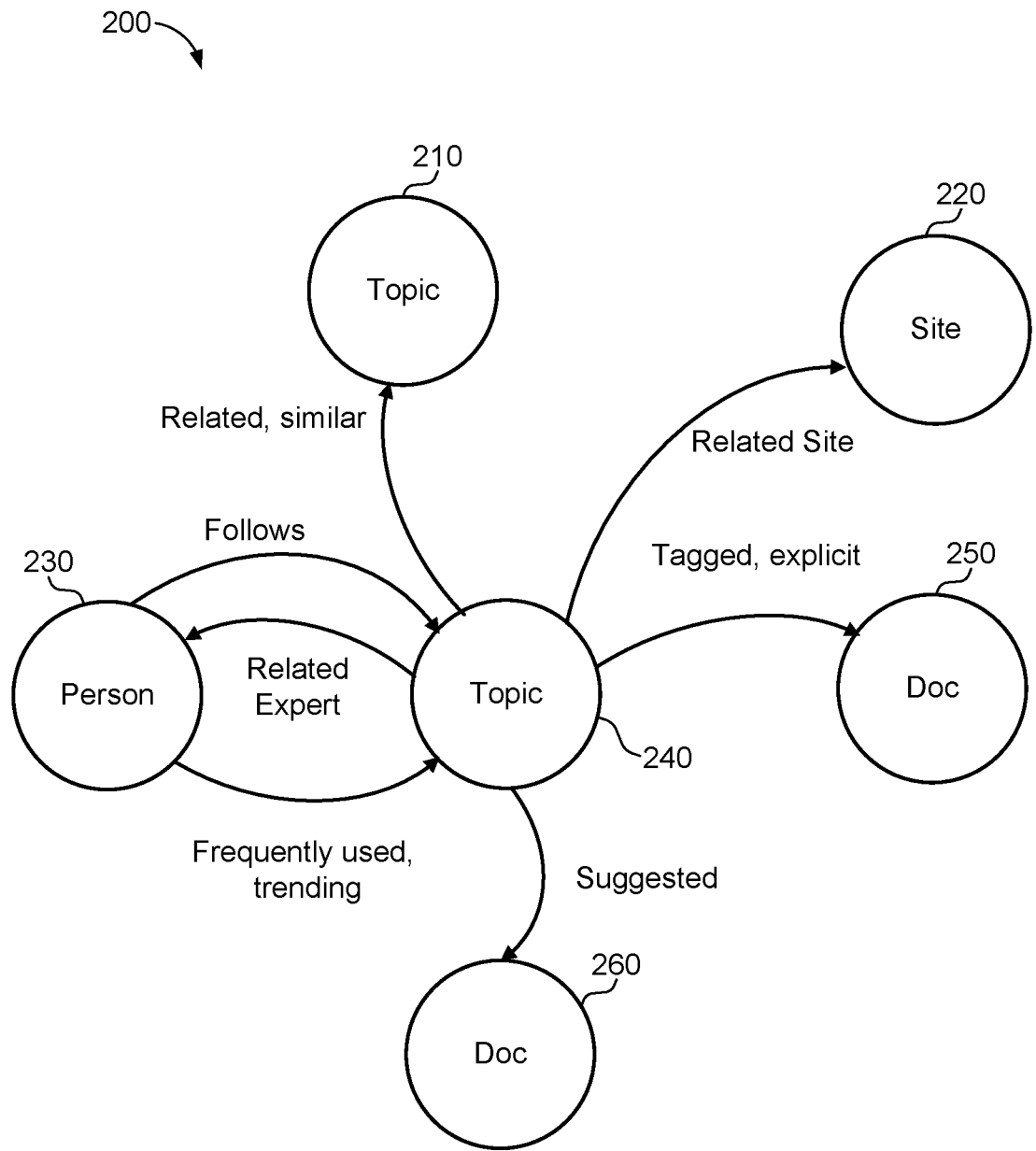
FIG. 2 is a schematic diagram of an example knowledge graph.

Referring now to FIG. 2, an example knowledge graph 200 includes entities 210, 220, 230, 240, 250, 260 and relationships between the entities. In an implementation, each entity is represented by an entity record, which includes attributes that describe the entity. For example, an attribute can store an attribute value or a link to another entity that is related to the entity. A schema for an entity type defines the attributes of the entity.

As illustrated, the example knowledge graph 200 is a partial knowledge graph including entities related to a topic entity 240. For example, another topic entity 210 is related to the topic entity 240 as a related, similar topic. As another example, a site entity 220 is related to the topic entity 240 as a related site. The site entity 220 may be, for example, a website. As another example, the document entity 250 is related to the topic entity 240 as a tagged, explicit document. For example, the document entity 250 can be tagged by a user curating a topic page for the topic entity 240. As a final example, the document entity 260 is related to the topic entity 240 as a suggested document.

Figure 3:
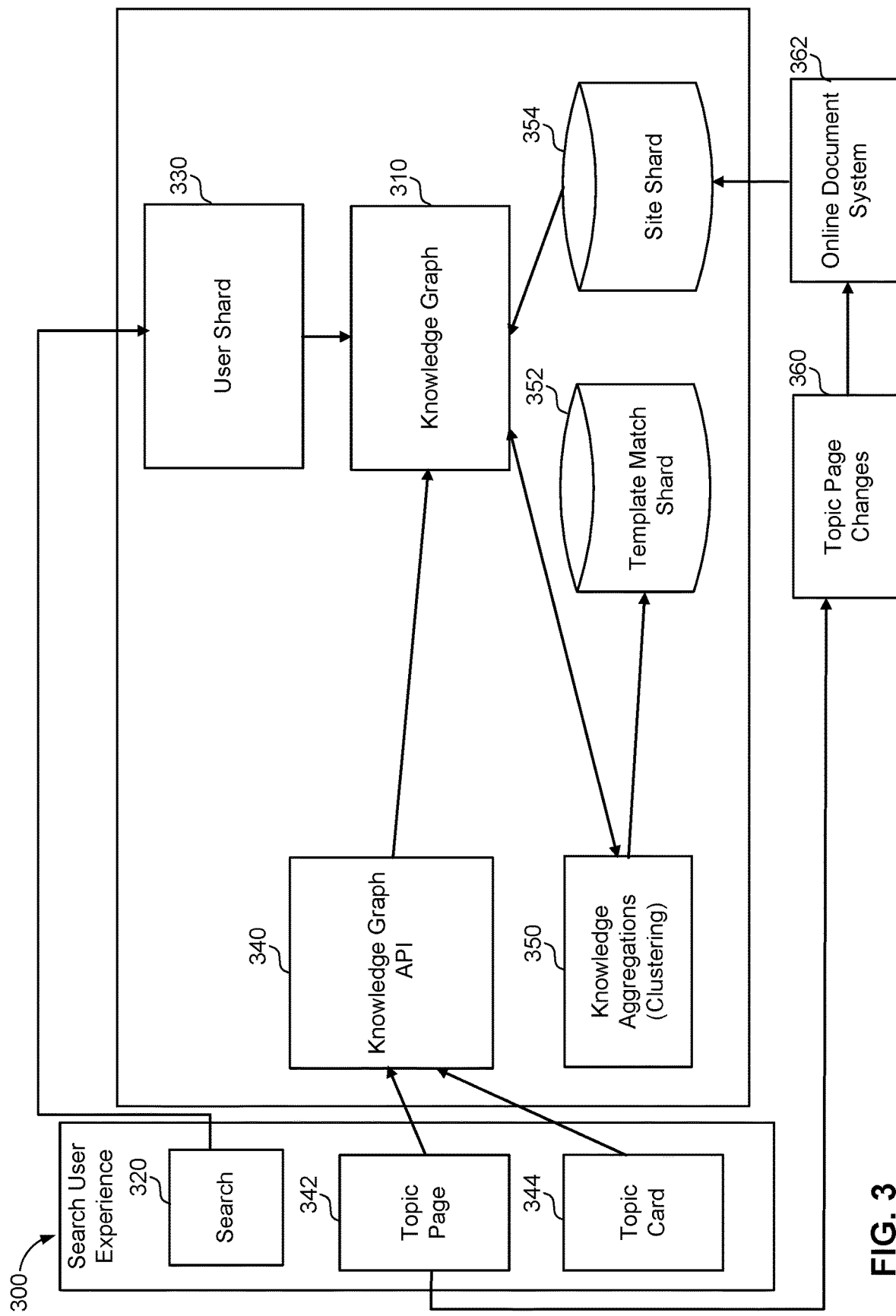
FIG. 3 is a schematic diagram of an example system architecture providing a search user for accessing a knowledge graph, in accordance with an implementation of the present disclosure.

FIG. 3 illustrates an example implementation of a system architecture for providing a search user experience utilizing a knowledge graph 310. The knowledge graph 310 is a knowledge graph including entities and relationships as discussed above regarding the example knowledge graph 200. The search user experience can be implemented using private cloud services, enterprise servers, on-premises equipment, or a combination thereof.

A user interface (e.g., user interface 172) includes a search tool 320 that allows searching of the knowledge graph 310. The architecture 300 may be implemented, for example, using an enterprise shard system with shards corresponding to particular tasks and particular documents. A shard may represent a partition of the service, usually a user partition (e.g., a user mailbox), or a site partition, or organization/aggregation partition (e.g., tenant shard). For instance, a user shard 330 receives search requests for the knowledge graph 310. Alternatively, a user interface 172 may search the knowledge graph 310 via a website, application, or a user partitioned service.

In an implementation, the knowledge graph 310 may be generated based on mailboxes, but may use another system (e.g., a file management system) to process individual documents. A knowledge aggregations process 350, which is also be referred to herein as clustering, is a batch process responsible for getting enterprise source documents for mining and performing a mining process. The knowledge aggregations process 350 generates or updates the knowledge graph 310 based on the enterprise source documents. For instance, the knowledge aggregations process 350 performs a clustering process on template matches or instances, which are potential entity names extracted from the enterprise source documents and stored in the template match shard 352. The knowledge aggregations process 350 generates new entity records to store in the knowledge graph 310 based on the potential entity names.

The user interface retrieves information from the knowledge graph 310 in the form of a topic page 342 or a topic card 344 via a knowledge graph API 340, which corresponds to the knowledge graph API 152. A topic page 342 is a document for a user including information from the knowledge graph 310 that the user is permitted to view. The permissions to view information from the knowledge graph 310 are based on permissions to view the enterprise source documents that support the entity record in the knowledge graph 310. Accordingly, users cannot use the knowledge graph 310 to gain access to information in source documents to which they do not already have access. A topic card 344 is a display of a subset of information in a topic page 342. A topic card 344 may be integrated into an application for viewing an enterprise document. For example, an email reader application may highlight or link words in an email to entities in the knowledge graph 310. The linking of words in a document to entities in the knowledge graph 310 may be referred to as annotating. Example enterprise documents may include digital documents (e.g., word processing documents, spreadsheets, presentations, drawings), emails, conversations, or other files stored within an enterprise intranet. A user can access the topic card 344 for an entity within the application, for example, by selecting the highlighted or linked word.

A user can curate a topic page 342 by performing a curation action. Curation actions include adding or removing attributes of an entity record including relationships to other entity records. Curation actions may also include adding or removing an entity record, creating a new topic, deleting an existing topic, and merging or splitting topics. As explained in further detail below, permission to curate a topic page 342 depends on the permissions of the user with respect to the topic page 342. In some cases, multiple topic pages for the same topic are created to show different information to different users. When the user performs a curation action, the topic page changes 360 are provided to an online document system 362 that stores the changes in a site shard 354. The knowledge aggregations process 350 updates the knowledge graph 310 based on the site shard 354 bypassing the clustering process. That is, the curation action provides a feedback to the clustering process because the curation actions populate explicit entities and relationships in the knowledge graph. These explicit entities provide positive labels for inference. Topic pages and relationships serve as authoritative data to train the set of topics for clustering, which may allow the machine learning process (i.e., clustering) to link more data (e.g., people, files, sites) to the entity than only a mined entity name. Additionally, the positive labels may be used to learn new templates that can generate entity names. Similarly, negative curation actions (e.g., deleting a related entity) may be used to infer a reliability of a template that generated the deleted relationship.

Figure 4:
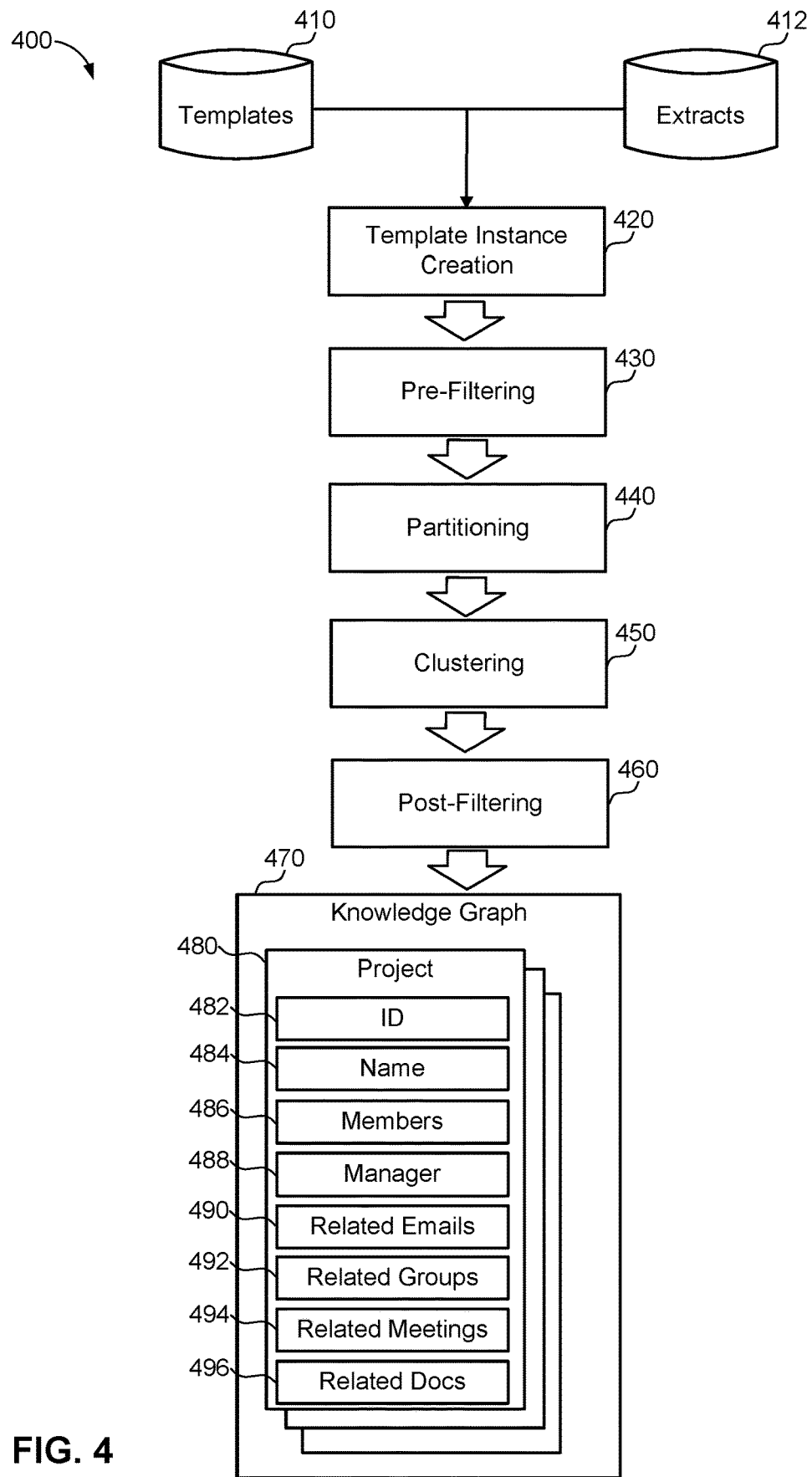
FIG. 4 is a conceptual diagram of an example mining process, in accordance with an implementation of the present disclosure.

Turning to FIG. 4, an example mining process 400 analyzes templates 410 and extracts 412 to generate entities to add to knowledge graph 470. The mining process 400 may be performed for a particular entity type such as a project, which may be defined by a schema. A project is an example of a topic that may be included in the knowledge graph 470. More generally, the mining process 400 identifies potential topic names using templates 410, and generates extracts 412 containing candidate topic names. Templates 410 are text or other formatted data with placeholders to insert formatted values of properties of an entity. An entity is an instance of an entity type, and is also referred to herein as an entity record. There are typically many templates per entity type, and these may be represented as a probability distribution over string values, or may be enumerated into a list. For example, a template may be applied to a window of text that can contain single or multi-word entity type, which is represented as a probability distribution over possible entity names containing a number of words. In an implementation, the number of words in a template is limited to 5. Templates combine the formatted property value into text or other formatted data. In an enterprise context, source documents are associated with metadata such as people (e.g., authors, recipients, owners), dates, and changes, which can be used to evaluate uncertainty regarding entity names and to identify relationships between entities.

An extract 412 is a portion of a source document that at least partially matches a template. Templates 410 are used to generate extracts 412 using queries. For example, a query for the template on a set of enterprise source documents compares the template 410 to each of the source documents to identify extracts 412 within the set of enterprise source documents. The extracts 412 at least partially match the template 410. An example extract 412 is a string including the formatted data of the template 410 and additional data, which corresponds to the placeholders in the template 410. Another example of an extract 412 is a subject line of an email having metadata that matches a template defining metadata (e.g., having a sender email address of a person who approves new projects).

The mining process 400 includes template instance creation process 420 in which extracts 412 are evaluated to determine an uncertainty regarding an entity name (e.g., a project name) associated with each extract 412. The template instance creation process 420 captures the uncertainty around the template match as a string distribution (e.g., alternative strings each associated with a probability).

The mining process 400 optionally includes pre-filtering process 430 in which the system automatically identifies common words that appear in more than a threshold percentage of the instances. Common words associated with a project name include "The," "A," "An" or "Of." Accordingly, pre-filtering process 430 can be used to improve uncertainty surrounding names by removing common or optional words, which may not occur in every instance of the name.

The mining process 400 includes partitioning process 440 in which the instances are partitioned by all possible entity names. As noted above, the template instance may be represented by a string distribution. In partitioning process 440, instances having overlapping strings may form a single partition. For example, partitioning process 440 would group instances having the terms "Project Valkyrie," "Valkyrie" and "Valkyrie Leader" (all of which may be extracted by a template such as "Project {Name}") into a single partition because they have the common word "Valkyrie," whereas an instance with the term "Sunlamp group" would be in a separate partition.

The mining process 400 includes clustering process 450 in which instances within a partition are clustered to identify entity names such as, for example, project names. The clustering process 450 is performed for each partition either sequentially or in parallel utilizing multiple processors. Clustering process 450 is an unsupervised machine learning process in which the instances are loaded into memory and clustering metadata defining probability distributions between instances are calculated until a stable probability distribution is reached. For example, in an implementation the clustering process 450 may perform Bayesian inference of the probability distribution for each entity. Those entity names with a probability higher than a threshold may be considered established entities, whereas entity names with a probability less than the threshold may be considered formative entities.

The mining process 400 optionally includes post-filtering process 460 in which identified entity names that do not correspond to a target entity type are removed. For example, enterprise documents can include a large number of extracts that refer to a common topic such as a holiday and have similar attributes as a project (e.g., a date, events, people) that are peripheral to the concept of a project. Accordingly, the clustering process 450 would identify those extracts as being related and identify a potential entity name (e.g., the holiday name). The post-filtering process 460 determines that the potential entity name does not correspond to the target entity when none of the clustered instances for the potential entity name match a key template for the entity. For example, a key template for a project entity type includes the word "Project."

The mining process 400 generates entity records such as the project entity record 480 within the knowledge graph 470 based on the mined entity names, associated attributes, and schemas for the entity type. The schema defines attributes within an entity record for an entity type. For example, a project schema defines a project entity record 480 for a project entity type. For instance, the schema for a project entity includes an ID attribute 482, name attribute 484, members attribute 486, manager attribute 488, related emails attribute 490, related groups attribute 492, related meetings attribute 494, and related documents attribute 496. The project entity record 480 includes zero or more attribute values for each attribute. A mandatory attribute may have at least one attribute value. For example, the ID attribute 492, name attribute 484, and members attribute 486 may be mandatory attributes. The mining process 400 populates the attribute values in the project entity record 480 based on the set of enterprise source documents associated with the mined entity name. Accordingly, the project entity record 480 includes attributes aggregated from the set of enterprise source documents associated with the mined entity name.

Figure 5:
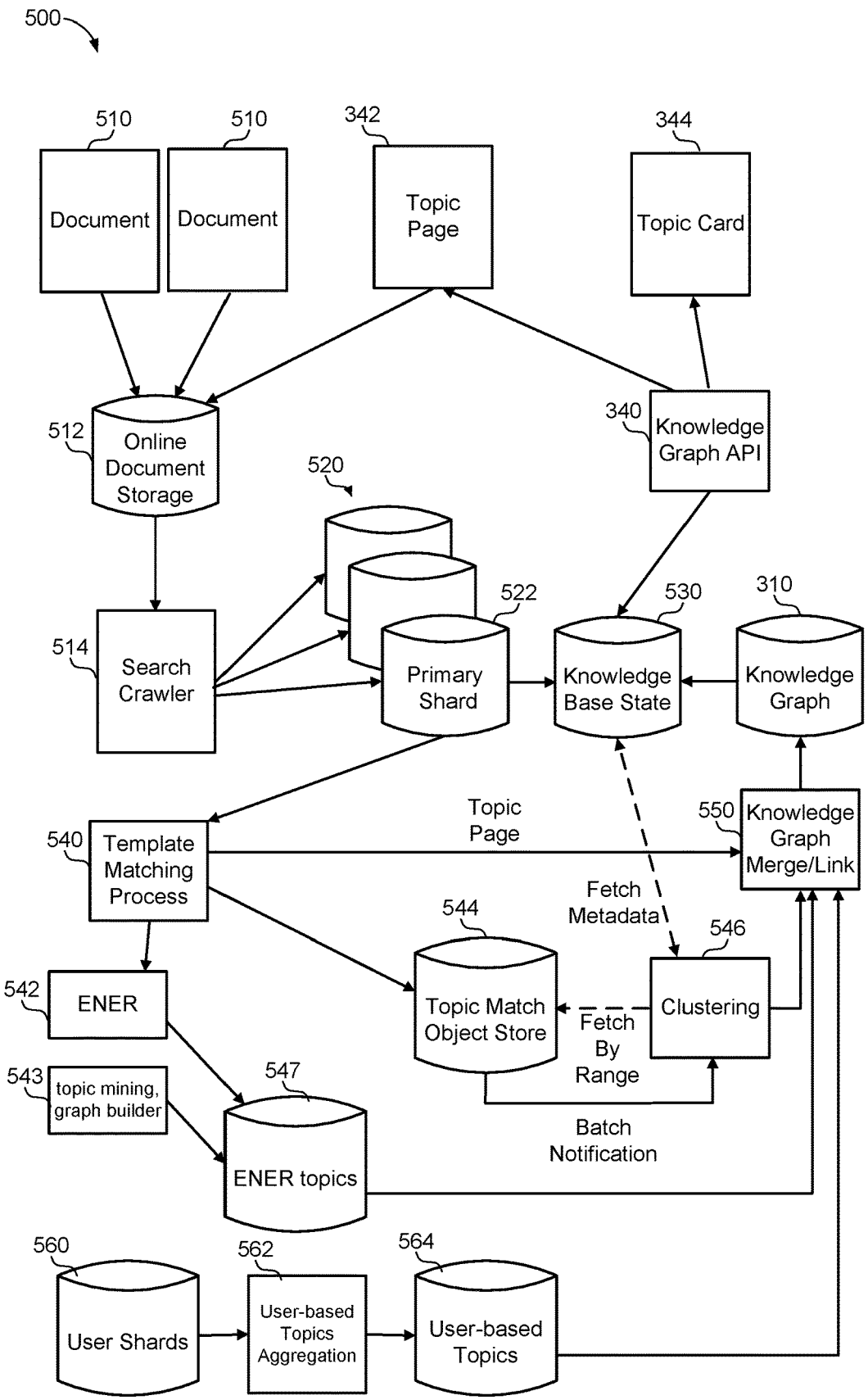
FIG. 5 is a schematic diagram of an example system architecture for managing a knowledge graph, in accordance with an implementation of the present disclosure.

Turning to FIG. 5, an example architecture 500 for generating, managing, and accessing a knowledge graph performs a mining of documents 510 to generate the knowledge graph 310, which is stored in an object store 530. A user can access the knowledge graph 310 via the knowledge graph API 340, which displays a topic page 342 and/or a topic card 344.

The documents 510 are user documents saved to an online document storage 512 within the enterprise intranet. For example, user documents include word processing documents, intranet sites, emails, calendar items, group conversations, group meetings, and other documents generated by the enterprise and stored in the online document storage 512. A search crawler 514 picks up the new document or updated document and pushes the document to a site shard 520, which may be a mailbox. The architecture 500 may include a separate shard 520 for each site. Documents that belong to a given site will be located in the same shard. A separate shard 522 may be associated with the knowledge graph. The shards 520 or primary shard 522 perform analytics to determine metrics for documents such as most popular documents. In an implementation with a distributed architecture, the shards may be associated with geographic regions and there may be at least one shard per region of the enterprise. Data mined or extracted from a document may be stored within a local geographic shard. Region specific policies for data collection, storage, retention, and protection may be implemented on the shard. The clustering process 546, described in further detail below, can access each of the geographic shards from a central location, but does not store user data.

The documents 510 are ingested from the mailboxes into an object store 530. The object store 530 is a platform that provides key value storage, which allows quick data access based on values while enforcing access permission policies. Inside the object store 530, there is a representation of every file inside the enterprise. The representation includes the metadata for the file. The object store 530 implements access permissions to the file. The object store 530 allows retrieval of metadata for the files.

The shards 522 detect events when a new document is added or changed and calls the template matching process 540. The template matching process 540 opens each source enterprise document and compares the new document or modified parts thereof to templates 410. The template matching process 540 creates the extracts 412. The template matching process 540 sends the extracts 412 and a document ID of the corresponding source enterprise document 510 to a topic match shard 544 and ENER system 542. Associated with ENER system 542 may be an ENER topic mining and graph builder function 543. The ENER system 542 may be an ENER topic mining and graph builder function 543 may provide outputs to ENER topics object store 547. The topic match shard 544 and ENER topics object store 547 may be a cluster of computers that provide key-value storage and fast lookup by specified keys. The user shards 560 detect events such as when electronic messages are sent and calls the user-based topics aggregation function 562. The user-based topics aggregation function 562 may provide outputs to user-based topics object store 564.

In an embodiment, user-based topics object store 564 may store extracted topics with search documents set and the user's top N people list from each user mailbox. Public key phrases and acronyms may also be stored from respective tenant shards. In an embodiment, the value associated with each topic may be a JSON serialized string consisting of the computed topic features such as related people, related acronyms, definition, etc.

In an embodiment, the user-based topics aggregation function 562 may read the topics for each user along with the topics' features. Each topic's features may be aggregated across users in that tenant to produce a new feature vector for each topic.

For example, a topic such as "knowledge mining" may be associated with a number of users in an organization. The user-based topics aggregation function 562 will aggregate a subset (features that are determined to be relevant) of the users' set of features for that particular topic to determine a derived set of features. Sample derivation methods include sum, max, min, avg, or a combination of aggregated features with predetermined rules.

The final feature vector extracted for each topic may be used to build a machine learning model (e.g., a binary classifier), which may be used to analyze the topics and generate a score to filter out the topics that are below a classifier threshold.

The final list of topics may be stored in user-based topics object store 564 along with additional data, such as acronyms and related people.

In one embodiment, the user-based topics aggregation function 562 may include the following operations:

Read the user-based topics for each user in the tenant
Read data associated with the tenant, e.g., acronyms
Join each topic with its related data, such as the acronyms or public NGrams that it matches
Aggregate users' features for each topic across users to generate a feature vector for each topic
Run a trained classifier over the topic feature vector
Filter out topics that are below the classifier threshold
Output data to the user-based topics object store 564

A clustering process 546 is performed either periodically as a time based process or incrementally as an event based process. The increments may be based on a batch of changes which is triggered periodically. One difference is that full clustering requires all documents in the tenant. In some embodiments, MapReduce, periodic tenant-wide aggregations, or periodic batches may be performed. For example, the clustering process 546 receives a batch notification from the topic match shard 544 indicating that either a new clustering should be performed or that a number of matching extracts (e.g., a batch) is ready for incremental clustering. The clustering process 546 is an unsupervised machine learning process that finds groupings or clusters within the extracts. The clustering process 546 performs multiple iterations on the extracts until a stable probability distribution is reached. The clustering process 546 collapses the multiple extracts into a single entity name. The clustering process 546 outputs the entity names and attributes associated with the entity names. The clustering process 546 can fetch metadata from knowledge base state 530 for use in the clustering and/or in creating entity records based on entity names. The metadata from the object store 530 may include a previous state of the clustering of the set of entities clustered in the current batch. The clustering process 546 may merge the new state into the previous state. For example, the clustering process 546 generates entity records based on the entity names and populates the entity records using metadata associated with the enterprise source documents supporting the entity names.

A knowledge graph merge/link process 550 updates the knowledge graph 310 based on the output of the clustering process 546, ENER topics 547, and user-based topics 564. For example, in a first implementation, the knowledge graph merge process 550 simply replaces the existing knowledge graph 310 with a new knowledge graph based on the output of the clustering process 546. Since the source documents include topic pages for previously mined entities, the new knowledge graph may also include the topic pages, which may be supplemented with additional mined related people, documents, etc. In a second implementation for incremental clustering, the knowledge graph merge process 550 merges entities from the clustering process 546, ENER topics 547, and user-based topics 564 with the existing knowledge graph 310. Further details of merging entities with an existing knowledge graph are described in further detail below with respect to FIG. 11.

The knowledge base state 530 may control access to entity records in the knowledge graph 310 based on permissions of each user to view the set of enterprise source documents associated with the entity record. A topic page 342 is created from an entity record and is owned by a user that creates the topic page 342. Creating the topic page explicitly links the mined entity record to the topic page. A user can also create a topic page that will be added to the knowledge graph 310 as a new entity record based on the content supplied by the user. The topic page owner controls what is displayed on the topic page 342. The knowledge graph 310 provides suggestions for the topic page 342 based on the attributes of the entity record and linked entities.

In an implementation, multiple topic pages on the same topic may be created. For example, the clustering process 546 mines a project entity name for a confidential project based on source documents for the project. An expert associated with the project can create a first topic page that includes data from the source documents that are available to other experts associated with the project. Another user (e.g., an accountant) may have limited access to information about the project (e.g., an invoice with the project name). The accountant may create a second topic page and add information related to the project finances, which becomes available to other users with access to the invoice. Both topic pages are linked to the same project entity record in the knowledge graph 310. A search for the project returns one or both of the topic pages based on the permissions of the user performing the search. An administrator can be provided with a notification of creation of multiple topic pages for the same topic and the administrator determines whether to combine the topic pages or delete one of the topic pages.

Figure 6:
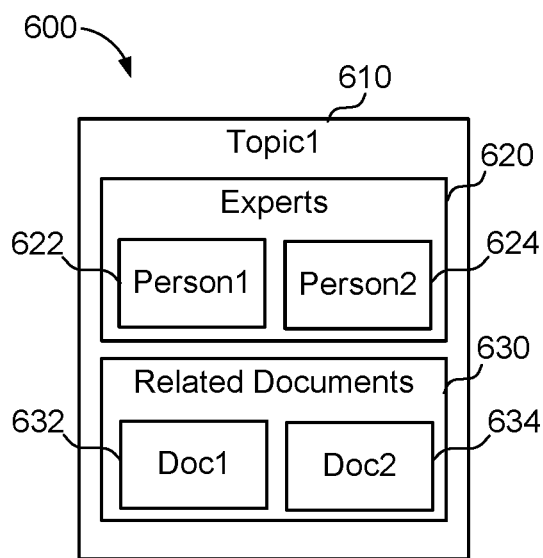
FIG. 6 is a diagram of an example topic entity record, in accordance with an implementation of the present disclosure.

Turning to FIG. 6, an example entity record 600 includes a topic name 610, an experts attribute 620 and a related documents attribute 630. The entity record 600 is a mined entity based on the topic name 610. The experts attribute 620 includes a first person 622 and a second person 624 that are associated with the topic name 610 based on the source documents. The related documents attribute 630 includes a first document 632 and a second document 634, which are the source documents associated with the mined topic name 610. The entity record 600 may also have related topics, sites, alternative names, and definitions.

Figure 7:
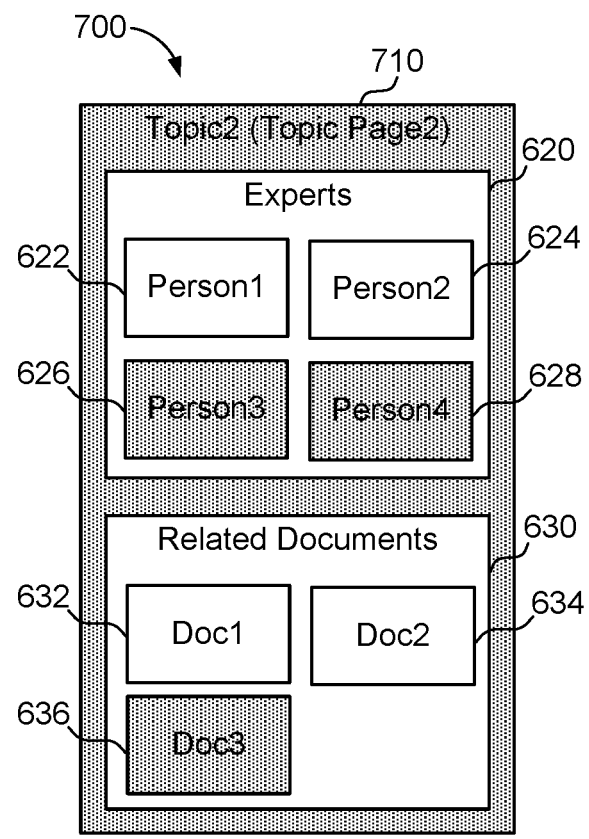
FIG. 7 is a diagram of an example topic entity record including a topic page, in accordance with an implementation of the present disclosure.

Turning to FIG. 7, another example entity record 700 includes a topic page 710. The topic page 710 shares the entity name with the entity record 700. The topic page 710 is created by a user based on the entity record 600. For example, the user has added a third person 626 and a fourth person 628 to the experts attribute 620 and added a third document 636 to the related documents attribute 630.

In an implementation, when a user views a topic page 342 or a topic card 344, content of the topic page 342 or a topic card 344 is trimmed based on permissions of the accessing user. For example, referring to the example entity record 700, the user does not have access to document 632, which was mined, but does have access to document 634 and document 636. In this case, only documents 634 and 636 will appear in the topic page 342 or topic card 344. Since the user has access to documents 634 and 636, the topic page 710 can be displayed and the references to the experts attribute 620 included. If document 632 is the only source for one of the experts (e.g., person 622), then person 622 will not be displayed in the topic page 710.

Referring again to FIG. 5, the knowledge graph API 340 receives requests from a user or an application of the user (e.g., a document viewer application) to view a topic page 342 or topic card 344, which is a subset of a topic page. The knowledge graph API 340 determines a topic key for the request, and submits the request to the knowledge base state 530, If the topic key corresponds to a topic page, the object store 530 retrieves the entity record for the topic and determines the sources for the topic page. Otherwise, the object store returns an indication that there is no corresponding topic. The object store 530 determines the permissions to view each attribute of the topic page as discussed above and returns the source documents to which the user has access. If the user does not have access to any of the sources, the object store 530 returns the indication that there is not corresponding topic. Otherwise, the knowledge graph API 340 constructs the topic page 342 or topic card 344 for viewing based on the entity record and source documents.

Figure 8:
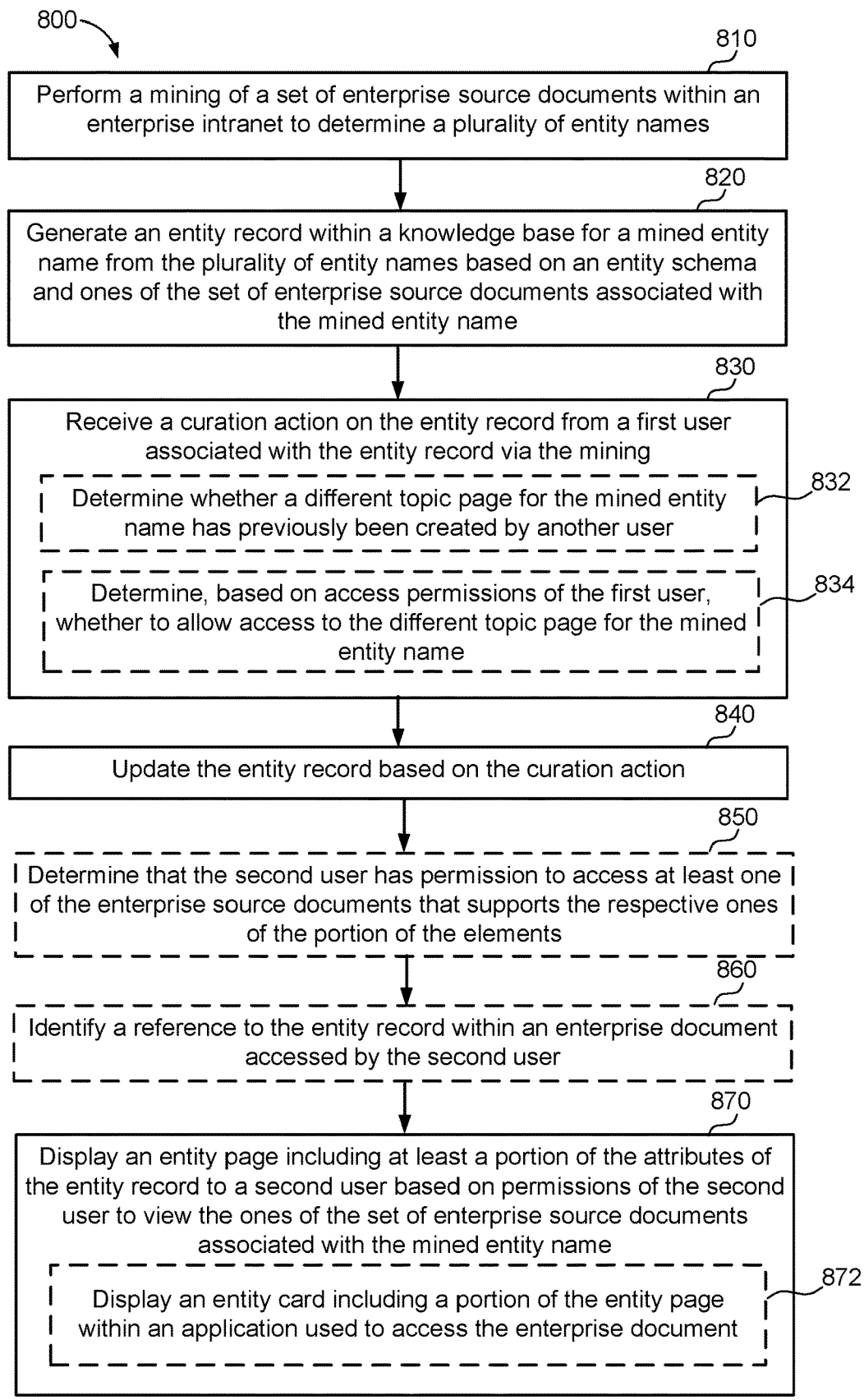
FIG. 8 is a flowchart of an example method of displaying an entity page based on an automatically generated knowledge graph, in accordance with an implementation of the present disclosure.

Turning to FIG. 8, an example method 800 displays an entity page based on an entity record within an automatically generated knowledge graph. For example, method 800 can be performed by the computer device 110, the architecture 300, or the architecture 500. Optional blocks are illustrated with dashed lines.

At block 810, the method 800 includes performing a mining of a set of enterprise source documents within an enterprise intranet to determine a plurality of entity names. In an implementation, the mining module 160 executes the name component 162 to perform the mining of the set of enterprise source documents 510 to determine the plurality of entity names. As discussed above, the mining module 160 and/or the name component 162 can execute the mining process 400 to perform the mining. Further details of block 810 are discussed below with respect to FIG. 9.

At block 820, the method 800 includes generating an entity record within a knowledge graph for a mined entity name from the plurality of entity names based on an entity schema and ones of the set of enterprise source documents associated with the mined entity name. The entity record includes attributes aggregated from the ones of the set of enterprise source documents associated with the mined entity name. In an implementation, the mining module 160 executes the aggregation component 164 to generate the entity record (e.g., project entity record 480) within the knowledge graph 310 for the mined entity name from the plurality of entity names based on the entity schema and ones of the set of enterprise source documents associated with the mined entity name.

At block 830, the method 800 includes receiving a curation action on the entity record from a first user associated with the entity record via the mining. In an implementation, the knowledge graph API 152 executes the curation component 154 to receive the curation action on the entity record from the first user associated with the entity record via the mining. For example, the first user can be the person 622 that is identified as an expert by the experts attribute 620.

For example, in some cases, the curation action is creation of a topic page 342 (e.g., the topic page 710) for the mined entity name. In sub-block 832, the block 830 optionally includes determining whether a different topic page for the mined entity name has previously been created by another user. For instance, the curation component 154 determines whether a different topic page for the mined entity name has previously been created by another user. If a different topic page for the mined entity name has previously been created by another user, in sub-block 834, the block 830 optionally includes determining, based on access permissions of the first user, whether to allow access to the different topic page for the mined entity name. For instance, the curation component 154 determines based on access permissions of the first user, whether to allow access to the different topic page for the mined entity name. For example, the permissions determine whether to first user is allowed to curate the different topic page for the mined entity name.

At block 840, the method 800 includes updating the entity record based on the curation action. In an implementation, the knowledge graph API 152 executes the curation component 154 to update the entity record based on the curation action. For example, the knowledge graph API sends the topic page changes 360 to the online document system 362, and the knowledge aggregations process 350 and/or knowledge graph merge process 550 updates the knowledge graph based on the topic page changes.

At block 850, the method 800 optionally includes determining that the second user has permission to access at least one of the enterprise source documents that support the respective ones of the portion of the attributes. In an implementation, the knowledge graph API 152 executes the display component 156 to determine that the second user has permission to access at least one of the enterprise source documents 510 that supports the respective ones of the portion of the attributes.

At block 860, the method 800 optionally includes identifying a reference to the entity record within an enterprise document accessed by the second user. In an implementation, the knowledge graph API 152 executes the display component 156 to identify the reference to the entity record within an enterprise document accessed by the second user.

At block 870, the method 800 optionally includes displaying an entity page including at least a portion of the attributes of the entity record to a second user based on permissions of the second user to view the ones of the set of enterprise source documents associated with the mined entity name. In an implementation, the knowledge graph API 152 executes the display component 156 to display an entity page including at least a portion of the attributes of the entity record to a second user based on permissions of the second user to view the ones of the set of enterprise source documents associated with the mined entity name. Displaying the entity page may be in response to block 850. In sub-block 872, the block 870 optionally includes displaying an entity card including a portion of the entity page within an application used to access the enterprise document. For instance, the sub-block 872 is optionally performed in response to the block 860. Accordingly, the entity card is displayed to the second user in association with the reference to the entity record.

Figure 9:
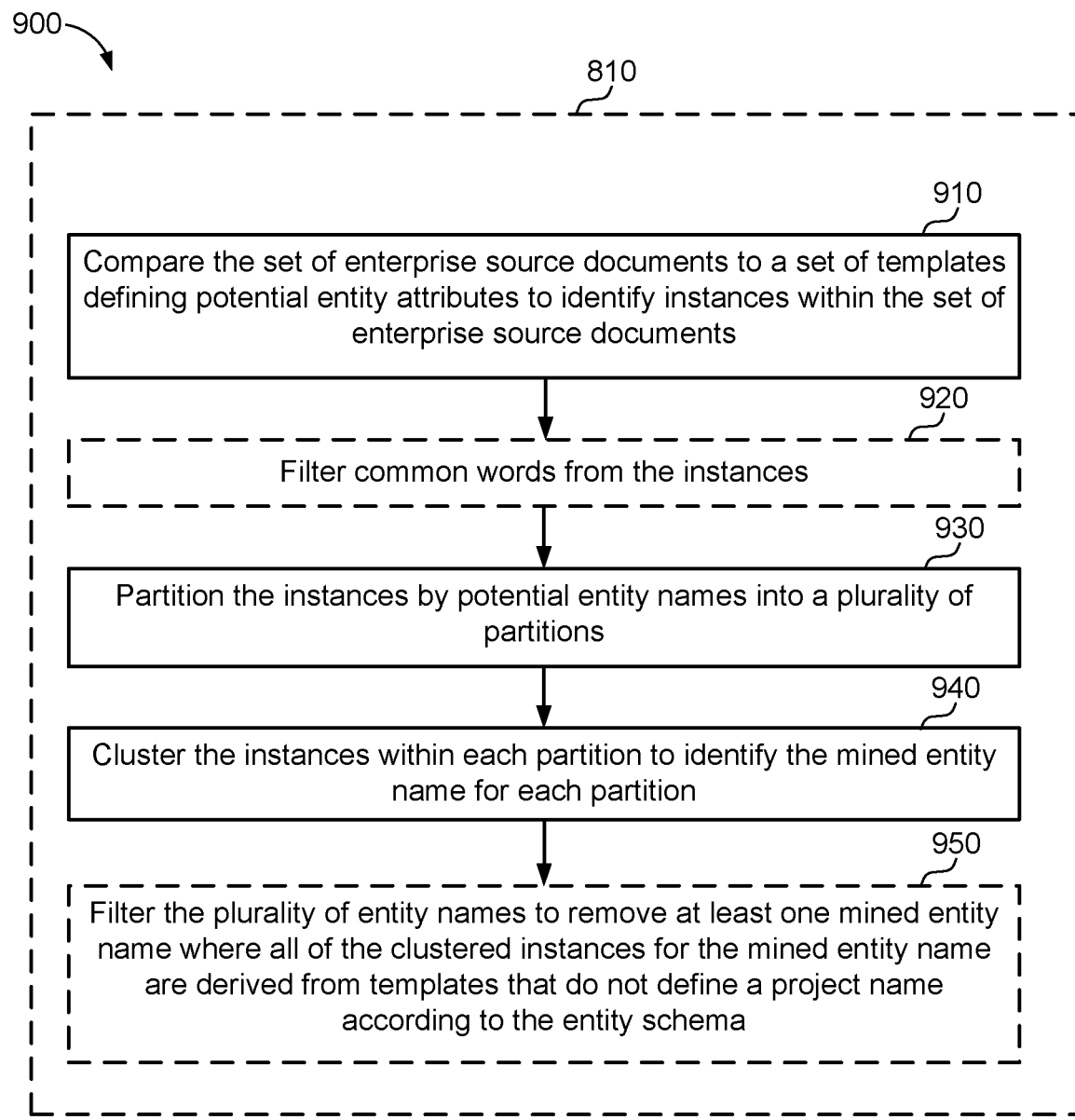
FIG. 9 is a flowchart of an example method of mining entity names from source documents, in accordance with an implementation of the present disclosure.

Turning to FIG. 9, an example method 900 performs a mining of a set of enterprise source documents within an enterprise intranet to determine a plurality of entity names. The method 900 is an example implementation of block 810 of method 800. For example, method 900 can be performed by the computer device 110, the architecture 300, or the architecture 500. Optional blocks are illustrated with dashed lines.

At block 910, the method 900 includes comparing the set of enterprise source documents to a set of templates defining potential entity attributes to identify instances within the set of enterprise source documents. In an implementation, the name component 162 executes the template instance creation process 420 to compare the set of enterprise source documents 510 to a set of templates 410 defining potential entity attributes to identify instances within the set of enterprise source documents.

At block 920, the method 900 optionally includes filtering common words from the instances. In an implementation, the name component 162 executes the pre-filtering process 430 to filter common words from the instances.

At block 930, the method 900 includes partitioning the instances by potential entity names into a plurality of partitions. In an implementation, the name component 162 executes the partitioning process 440 to partition the instances by potential entity names into a plurality of partitions.

At block 940, the method 900 includes clustering the instances within each partition to identify the mined entity name for each partition. In an implementation, the name component 162 executes the clustering process 450 to cluster the instances within each partition to identify the mined entity name for each partition At block 950, the method 900 optionally includes filtering the plurality of entity names to remove at least one mined entity name where all of the clustered instances for the mined entity name are derived from templates that do not define a project name according to the entity schema. In an implementation the name component 162 executes the post-filtering process 460 to filter the plurality of entity names to remove at least one mined entity name where all of the clustered instances for the mined entity name are derived from templates that do not define a project name according to the entity schema. In another implementation, post-filtering may be used to exclude entities that have high level of duplication, indicated by a high number of disconnected instances. For example, project funding, is a common phrase that occurs frequently on different sites. Post-filtering can catch this by eliminating entities with a degree of duplication higher than some threshold, like (e.g., 5 or more).

Figure 10:
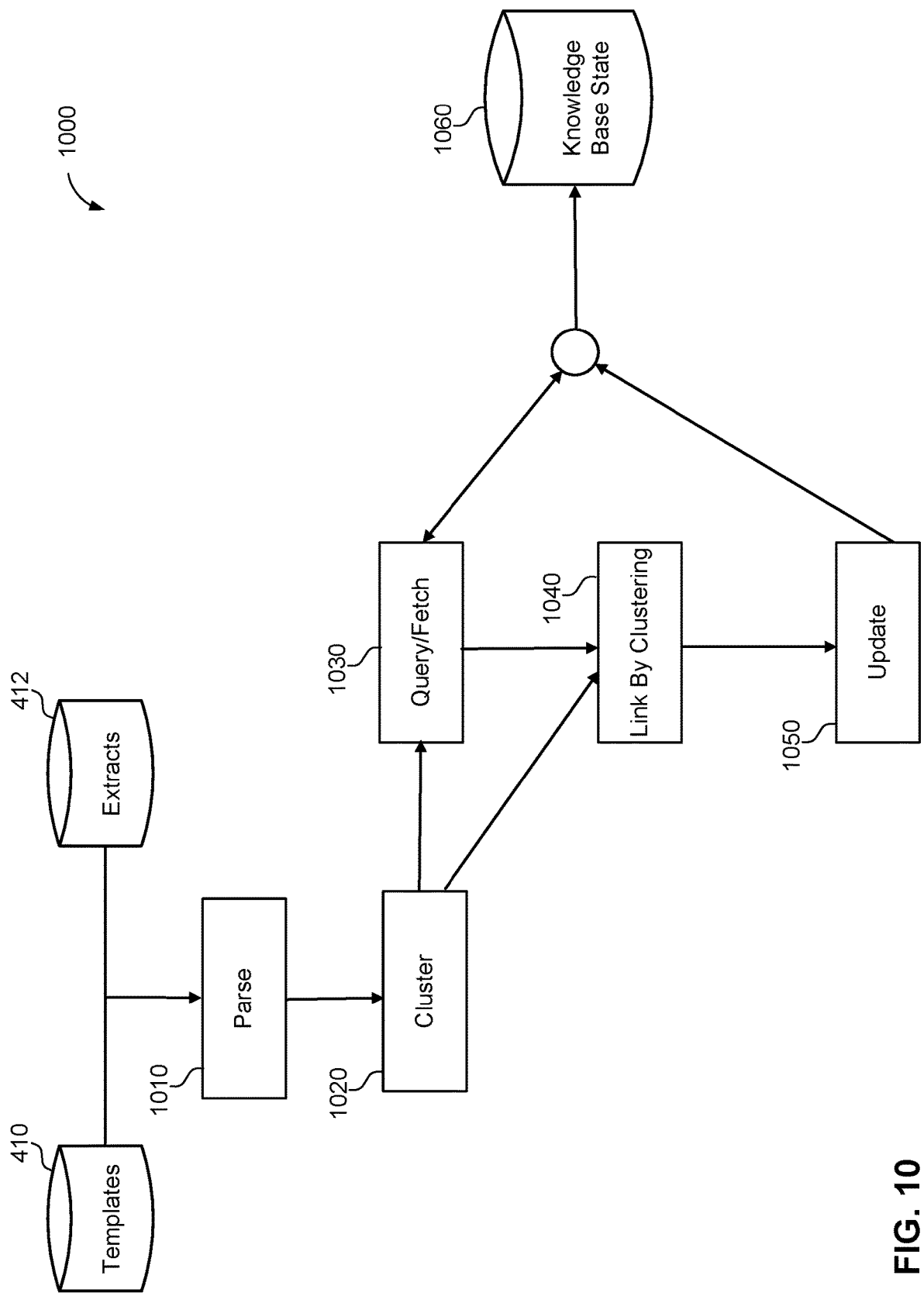
FIG. 10 is a conceptual diagram of an example incremental clustering process, in accordance with an implementation of the present disclosure, in accordance with an implementation of the present disclosure.

Turning to FIG. 10, another example mining process 1000 performs incremental clustering to update a knowledge graph 470. The mining process 1000 may be performed for a particular entity type such as a project entity type, which may be defined by a schema, to generate an entity record such as project entity record 480. Similar to the mining process 400, the mining process 1000 may be performed on template 410 and extracts 412, which may be extracted from source documents 510.

A parsing process 1010 is similar to the template instance creation process 420. For example, the template matching process 540 evaluates the templates 410 and the extracts 412 to determine an uncertainty regarding an entity name (e.g., a project name) associated with the extract. The parsing process 1010 captures the uncertainty around the template match as a string distribution (e.g., alternative strings each associated with a probability). The parsing process 1010 generates a limited number of instances. In an implementation, the parsing process 1010 generates instances until the limited number of instances is reached, at which point the parsing process 1010 triggers a clustering process 1020.

The clustering process 1020 is similar to the clustering process 450, except that the clustering process 1020 operates on the limited number of instances as a batch, instead of on all extracted instances. The number of operations and memory required for the clustering process 1020 is on the order of $N^2$, where N is proportional to the number of instances. An enterprise intranet may include thousands or possibly millions of source documents, each having hundreds or possibly thousands of extracts. Accordingly, the clustering process 1020 may become infeasible given limited computing resources and a large number of source documents. Performing the clustering process 1020 incrementally on the limited number of instances can reduce the use of computing resources. The limited number of instances can be configured to improve feasibility and/or speed of the clustering process. For example, the number of the instances can be based on an amount of the memory required to store the number of the instances and associated clustering metadata. Performing the clustering process 1020 on the number of the instances and performing the clustering on a second set of the number of the instances uses less memory than performing the clustering on a set of instances including twice the number of the instances due to the $N^2$ complexity. The clustering process 1020, however, may not produce complete information about entities because information from some of the instances (e.g., instances greater than the limited number) is not included in the batch. Accordingly, the clustering process 1020 outputs potential entity names, which are considered statistically formative entities. A statistically formative entity is associated with a greater level of uncertainty than an established entity.

The mining process 1000 includes a query/fetch process 1030 for retrieving a set of candidate entity records that might be related to the potential entity names. That is, the knowledge graph 1060 already includes the candidate entity records and the potential entity names may match one of the candidate entity records and include additional information about the entity that should be included in the entity record. Querying the knowledge base state 1060 based on a potential entity name is complicated by uncertainty associated with a potential entity name. As discussed above, a potential entity name is represented by a probability distribution over multiple strings. In an implementation, the query/fetch process queries the knowledge graph 1060 using each of the multiple strings in the probability distribution for each potential entity name. The query returns a set of candidate entity records that at least partially match each potential entity name. That is each candidate entity record includes an entity name that at least partially matches (e.g., includes a subset of a queried string) one or more of the potential entity names.

A link by clustering process 1040 is similar to the clustering process 1020, except the link by clustering process 1040 operates on the potential entity names and the set of candidate entity records. As discussed above, the entity records include attributes and attribute values. In order to perform the link by clustering process 1040 based on uncertainty, an uncertainty associated with each entity record is regenerated based on the source documents. That is, the link by clustering process 1040 determines a probability distribution for the entity name of the entity record based on source documents linked to the entity record. For instance, in an implementation, the link by clustering process 1040 performs the mining process 400 on the source documents linked to the entity record. In an implementation, an established entity record is associated with a probability distribution over a single string (e.g., a probability of 1 or a level of uncertainty of 0). The link by clustering process 1040 performs iterations of unsupervised learning on the potential entity names and candidate entity records to arrive at a new stable probability distributions. Linking involves combining evidence. For example, the new batch of potential entities may bring more evidence for a particular entity name to be a project. The probability distribution for the entity may then exceed a threshold and the new entity can become established. Linking also involves potential matches on the metadata between source documents for a given entity. So, if documents associated with an entity all belong to the same site, or a common set of people contributed to them, or the set of people belong to common groups/distribution lists, the probability of the entity name may be greater. As discussed in further detail below with respect to FIG. 11, the link by clustering process 1040 results in a merged entity record, an updated entity record, a new entity record, or no change. Additionally, linking can be performed across topic data items provided by different toolkits as described herein, using the same metadata and signals as any single toolkit An update process 1050 stores the merged entity records, updated entity records, or new entity records in the knowledge graph 1060. In an implementation, the update process 1050 includes determining a status of each of the updated matching candidate entity records and each of the new entity records as one of established or formative based on a level of uncertainty for a respective entity record. The status is stored with the entity record (e.g., as metadata) and can be used in the link by clustering process 1040 when the entity record is a candidate entity record.

Figure 11:
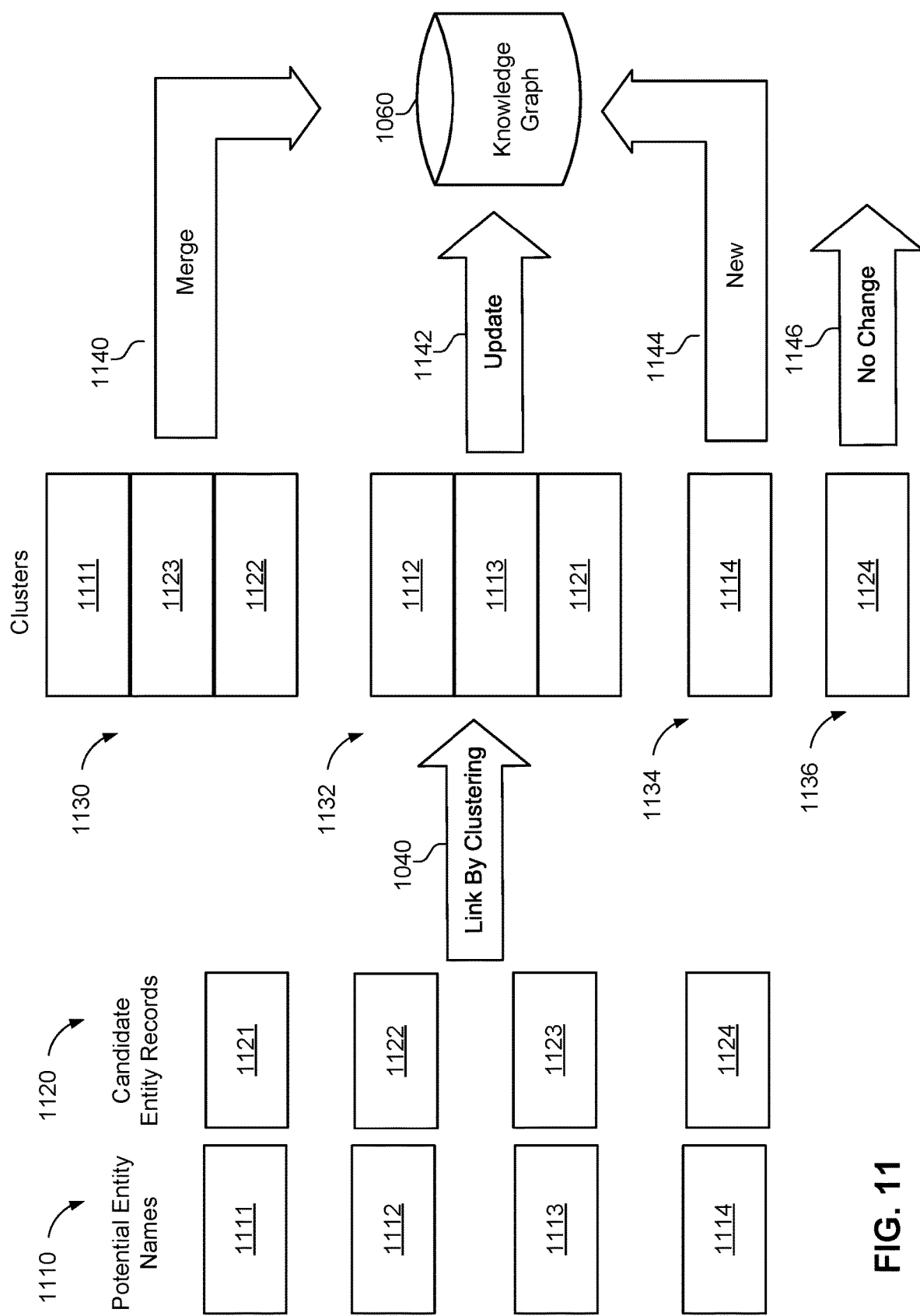
FIG. 11 is a conceptual diagram of an example of clustering potential entity names and candidate entity records to update a knowledge graph.

Referring now to FIG. 11, an example of link by clustering process 1040 operates on a set of potential entity names 1110 and a set of candidate entity records 1120 to produce clusters 1130, 1132, 1134, and 1136. The link by clustering process 1040 performs one of a merge operation 1140, update operation 1142, new entity operation 1144, or no change operation 1146 on each cluster.

For instance, a first cluster 1130 includes a potential entity name 1111 and candidate entity records 1122 and 1123. The candidate entity records 1122 and 1123 are the result of a previous clustering process 1020 and may include similar names, but the previous clustering process 1020 determined that the candidate entity records 1122 and 1123 are unique entities based on the probability distributions. When the link by clustering process 1040 considers the potential entity name 1111, however, the potential entity name 1111 includes information related to both candidate entity record 1122 and 1123 such that the clustering operation determines that there is a single entity. Accordingly, the link by clustering process 1040 performs the merge operation 1140 to update at least one of the candidate entity records 1122 and 1123, or create a new entity record. For example, the merge operation 1140 can update the candidate entity record 1122 to include information from the candidate entity record 1123 and the potential entity name 1111 and delete the candidate entity record 1123 to create a single entity record for the cluster 1130. Alternatively, the link by clustering process 1040 can generate a new entity record based on potential entity name 1111, copy information from the candidate entity records 1122 and 1123 into the new entity record, and delete the candidate entity records 1122 and 1123.

The second cluster 1132 includes the potential entity names 1112 and 1113, and the candidate entity record 1121. That is, the link by clustering process 1040 determines that the potential entity names 1112 and 1113 refer to the existing candidate entity record 1121. Accordingly, the link by clustering process 1040 performs an update operation 1142 to update the candidate entity record 1121 with information from the potential entity names 1112 and 1113.

The third cluster 1134 includes a single potential entity name 1114. Accordingly, the clustering process 1040 determines that the single potential entity name 1114 is a new entity (e.g., an entity first discussed in a new source document) and performs the new entity operation 1144 to create a new entity record.

The fourth cluster 1136 includes a single candidate entity record. That is, the clustering process 1040 determines that although the candidate entity record 1124 was returned by a query for a potential entity name, the candidate entity record 1124 is actually distinct from any of the potential entity names. Accordingly, the link by clustering process 1040 may perform a no change operation 1146, which may include deleting the cluster 1136 without updating the knowledge graph 1060 because there are no changes to the entity record 1124.

Figure 12:
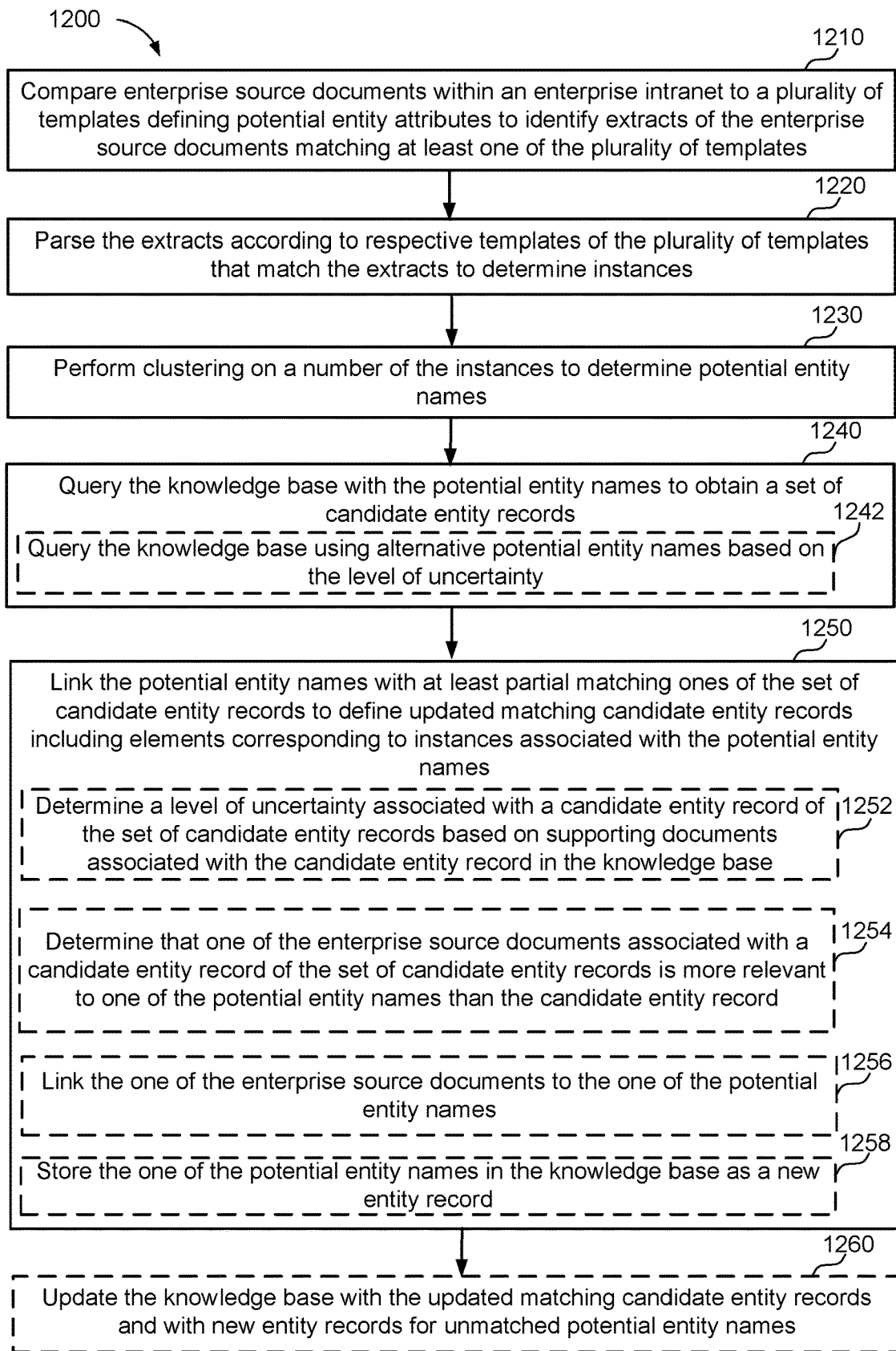
FIG. 12 is a flowchart of an example method of mining entity names from source documents using incremental clustering, in accordance with an implementation of the present disclosure.

Turning to FIG. 12, an example method 1200 performs incremental mining on extracts from source documents to update a knowledge graph. For example, method 1200 can be performed by the computer device 110, the architecture 300, or the architecture 500. Optional blocks are illustrated with dashed lines.

At block 1210, the method 1200 includes comparing enterprise source documents within an enterprise intranet to a plurality of templates defining potential entity attributes to identify extracts of the enterprise source documents matching at least one of the plurality of templates. In an implementation, the search crawler 514 invokes an event based assistant that compares the enterprise source documents 510 stored in the online document storage 512 to the templates 410 to identify extracts 412 of the enterprise source documents 510 matching at least one of the plurality of templates 410. The event based assistant stores the extracts in the primary shard 522.

At block 1220, the method 1200 includes parsing the extracts according to respective templates of the plurality of templates that match the extracts to determine instances. In an implementation, the template matching process 540 parses the extracts 412 according to respective templates 410 of the plurality of templates that match the extracts to determine instances. Accordingly, block 1220 may execute the template instance creation process 420 described above with respect to FIG. 4. The template matching process 540 stores the instances in the topic match shard 544 via, for example, the substrate bus 542.

At block 1230, the method 1200 includes performing clustering on a number of the instances to determine potential entity names. In an implementation, the clustering process 546 receives a batch notification when the topic match shard 544 is storing the number of the instances. The clustering process 546 fetches the number of instances from the topic match shard and performs clustering on the number of instances to determine potential entity names. Accordingly, the block 1230 may execute the clustering process 450 described above with respect to FIG. 4. In an implementation, the block 1230 may optionally include one or more of the pre-filtering process 430, partitioning process 440, and post-filtering process 460 described above.

At block 1240, the method 1200 includes querying the knowledge graph with the potential entity names to obtain a set of candidate entity records. In an implementation, the knowledge graph merge process 550 queries the knowledge graph 310 with the potential entity names to obtain a set of candidate entity records 1120. Optionally, at sub-block 1242, the block 1240 includes querying the knowledge graph using alternative potential entity names based on the level of uncertainty. The level of uncertainty is assigned to an attribute associated with a potential entity name during the clustering in block 1230. Accordingly, the sub-block 1242 includes performing the query/fetch process 1030 using alternative potential entity names (e.g., the multiple strings in a probability distribution).

At block 1250, the method 1200 includes linking the potential entity names with at least partial matching ones of the set of candidate entity records to define updated matching candidate entity records including attributes corresponding to instances associated with the potential entity names. In an implementation, the knowledge graph merge process 550 links the potential entity names with at least partial matching ones of the set of candidate entity records to define updated matching candidate entity records including attributes corresponding to instances associated with the potential entity names. For instance, the knowledge graph merge process 550 performs clustering on the potential entity names and the set of candidate entity records. When multiple toolkits are implemented, linking can be performed across multiple toolkits, Another aspect of linking is based on people associated with each entity and the relationships between them. If people are deemed as working closely together, the entities with the same name are likely to be the same and are therefore merged. Linking can also use site IDs and hub IDs to conflate entities that are based on closely stored documents. Organizational hierarchy and common group memberships can also be used for linking entities.

In sub-block 1252, the block 1250 optionally includes determining a level of uncertainty associated with a candidate entity record of the set of candidate entity records based on supporting documents associated with the candidate entity record in the knowledge graph. For instance, the knowledge graph merge process 550 and/or the link by clustering process 1040 determines the level of uncertainty (e.g., a probability distribution) associated with a candidate entity record 1120 in the knowledge graph 1060.

In sub-block 1254, the block 1250 optionally includes determining that one of the enterprise source documents associated with a candidate entity record in the set of candidate entity records is more relevant to one of the potential entity names than the candidate entity record. For example, as illustrated in FIG. 11, the candidate entity record 1123 is clustered with the potential entity name 1111 and the candidate entity record 1122 because one of the enterprise source documents associated with the candidate entity record 1123 is more relevant to the potential entity name 1111 than the candidate entity record 1123. In sub-block 1256, the block 1250 optionally includes linking the one of the enterprise source documents to the one of the potential entity names. For example, the merge operation 1140 links the source document to the potential entity name 1111 (e.g., by copying a related documents attribute 630). In sub-block 1258, the block 1250 optionally includes storing the one of the potential entity names in the knowledge graph as a new entity record. For example, the merge operation 1140 stores a new entity record based on the potential entity name 1111 and the candidate entity records 1122 and 1123.

At block 1260, the method 1200 includes updating the knowledge graph with the updated matching candidate entity records and with new entity records for unmatched potential entity names, wherein the unmatched potential entity names are defined by ones of the potential entity names that do not match with any of the set of candidate entity records. In an implementation, the knowledge graph merge process 550 updates the knowledge graph 310 with the updated matching candidate entity records (e.g., from merge operation 1140 and update operation 1142) and with new entity records for unmatched potential entity names (e.g., from new entity operation 1144). The unmatched potential entity names are defined by the potential entity names 1110 (e.g., entity name 1114) that do not match with any of the set of candidate entity records.

Figure 13:
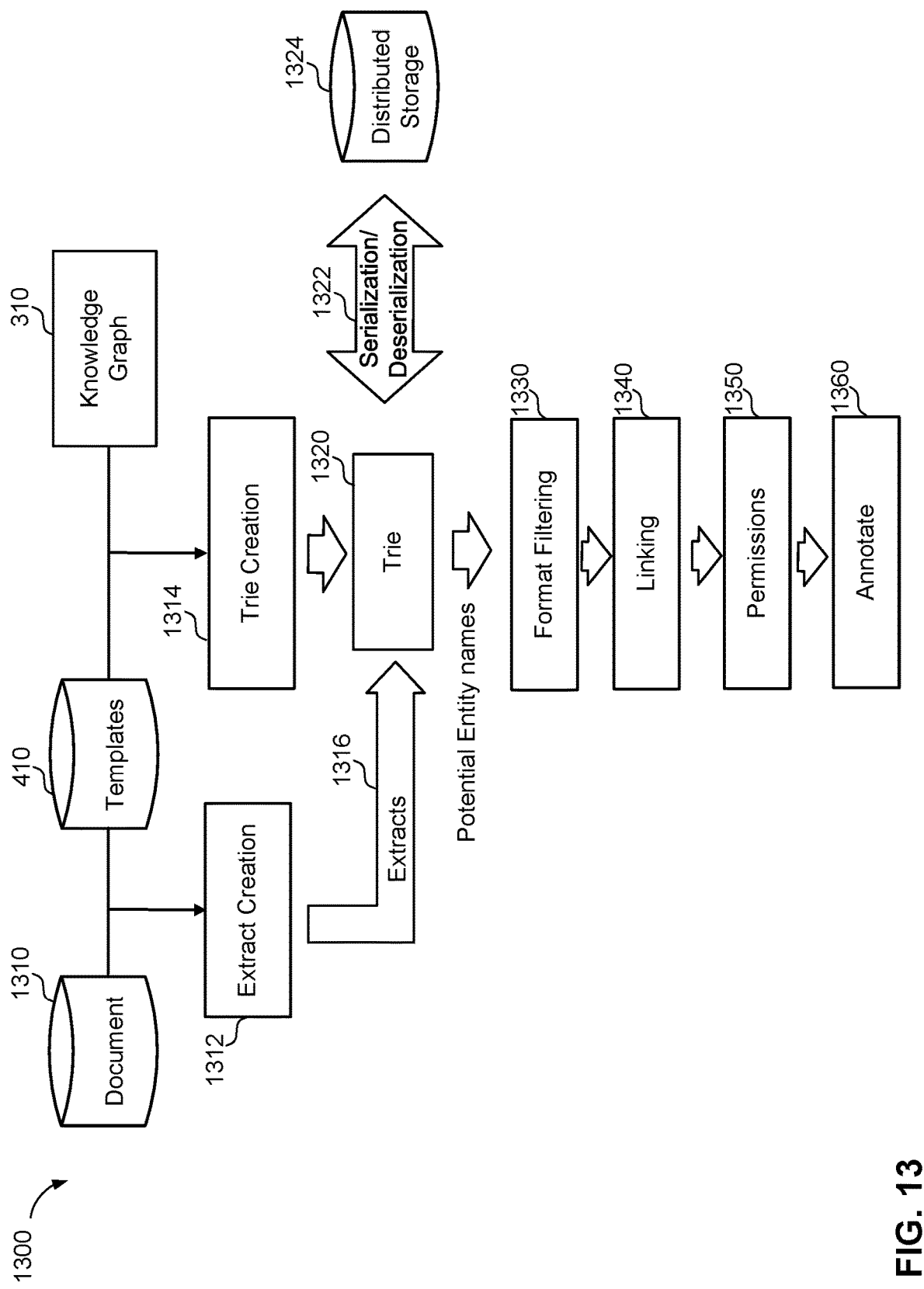
FIG. 13 is a diagram of an example process for annotating a document.

Referring now to FIG. 13, an example annotation process 1300 may annotate a document 1310 based on one or more of templates 410 and a knowledge graph 310. The document 1310 may be a document to be viewed by a user within an application. The annotation process 1300 highlights and/or links words in the document that correspond to an entity name for which the knowledge graph 310 includes an entity record. Generally, simple matching of words in the document to entity names is likely to generate too many matches. Additionally, some techniques for identifying words (e.g., exact string matching and regular expressions) may be slow or overly complex given a potentially large number of entity names. At a high level, the annotation process 1300 uses templates 410 and a trie 1320 to find potential entity names in the document 1310, then optionally performs format filtering and/or linking to remove less relevant potential entity names. Finally, the annotation process 1300 annotates the document 1310 with links to the knowledge graph 310.

As noted above, templates 410 are text or other formatted data with placeholders to insert formatted values of properties of an entity. In an extract creation operation 1312, the templates 410 may be applied to a document 1310 to generate extracts 1316. An extract 1316 is a portion of the document 1310 that at least partially matches a template. The templates 410 are used to generate extracts 1316 using queries. For example, a query for the template on the document 1310 compares the template 410 to the document 1310 to identify extracts 1316 within the document 1310. The extracts 1316 at least partially match the template 410. An example extract 1316 is a string including the formatted data of the template 410 and additional data, which corresponds to the placeholders in the template 410. In addition to templates, ENER may also be used as topic reference candidates, as further described herein.

In a trie creation operation 1314, a trie 1320 is created based on the knowledge graph 310 and the templates 410. The trie 1320 may be, for example, an Aho-Corasick trie. The knowledge graph 310 and the templates 410 may provide a dictionary of terms. For example, the dictionary of terms may include entity names defined in the knowledge graph 310 and the templates 410. The trie creation operation 1314 may generate the trie 1320 according to a known algorithm (e.g., the Aho-Corasick algorithm) for generating a trie based on a dictionary. In an implementation, the trie 1320 may be used to identify potential entity names in a given document 1310. Accordingly, the trie 1320 may be reused, and may be used by different users or applications. To save time, it may be beneficial to store the trie 1320 in a distributed cache 1324. As discussed in further detail below with respect to FIG. 14, a serialization/deserialization operation 1322 may be used to convert the trie 1320 into a format for the distributed cache 1324 (e.g., a byte array or string).

In the format filtering operation 1330, the potential entity names (or extracts) 1316 may be filtered based on formatting within the document 1310. Generally, the most useful entity names to annotate are likely to include formatting to make the entity name prominent. For example, the entity name may be located in a heading, include capital letters, include a hyperlink, be bolded, italicized, or underlined. The format filtering operation 1330 may select potential entity names that have such formatting, or may exclude potential entity names that lack such formatting. Additionally, the format filtering operation 1330 may reduce repetition by selecting a single instance of a potential entity name (e.g., the instance with the most prominent formatting according to a ranking of formats).

The linking operation 1340 may determine whether potential entity names can be linked to entity records within the knowledge graph 310. The linking operation 1340 may be similar to the query/fetch process 1030 and the link by clustering process 1040 described above with respect to FIG. 10. That is, the linking operation 1340 may include querying the knowledge graph 310 for entities matching the potential entity names and fetching the entity records. The linking operation 1340 may then determine whether there is a path in the knowledge graph 310 between the current document 1310 and the entity record. For example, an author of the document 1310 may be "working with" the people related to the entity. That is, there may be a "working with" relationship in the knowledge graph 310 between the author of the document 1310 and related person for the entity. As another example, the current document 1310 could be on the same site as other documents related to the entity, or the site of the current document 1310 can be in the same department as the majority of documents related to the entity. The linking operation 1340 works by finding some path in the knowledge graph 310 between the current document and the entity. In an implementation, the path can be a multi-hop traversal of the graph. The number of hops may be limited to 3, for example. The linking operation 1340 may start at the document, then traverse the knowledge graph 310 based on metadata. For example, the linking operation 1340 may traverse to a person, who is the author, or other modifiers of the document, or may traverse to a site or department, then to a related person or site, and then to the topic. Many different combinations of paths through the graph are possible. Furthermore, the linking operation 1340 may be performed across multiple toolkits as described herein.

The permissions operation 1350 may determine whether the user viewing the document 1310 has permission to access each entity record. As discussed above, a user may have permission to view an entity record when the user has permission to view at least one source document for the entity record. Since annotating a document with a link to an entity record may provide information about the entity record even if the user does not follow the link, the annotation process 1300 may follow the same rules for permissions as actually viewing the entity record, entity page, or entity card.

The annotate operation 1360 may alter the user's view of the document 1310. For example, the annotate operation 1360 may change the formatting of one or more words corresponding to an entity name. For instance, the annotate operation 1360 may highlight, bold, underline, italicize, color, or otherwise alter the format of the words to make the words stand out. The annotate operation 1360 may also create a link from the words to the corresponding entity record. The link may display an entity card for the entity record when the words are hovered over or selected by the user. As discussed above, the entity card may include a subset of the information in the entity page. The information in the entity card may be trimmed based on the permissions of the user for each attribute included in the entity card.

Figure 14:
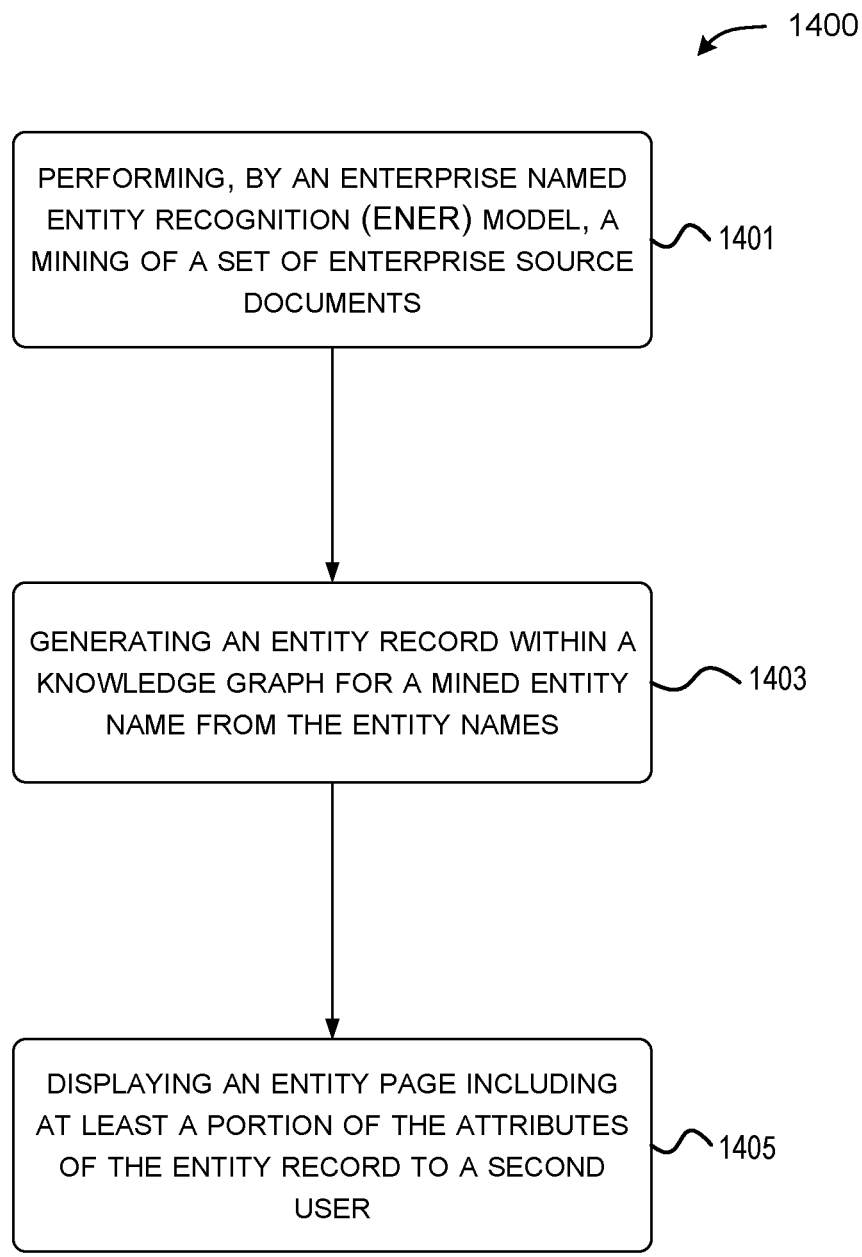
FIG. 14 is a diagram of an example process in accordance with an implementation of the present disclosure.

FIG. 14 illustrates aspects of a routine 1400 for enabling aspects of the techniques disclosed herein as shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 1400 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 1400 may be also implemented in many other ways. For example, the routine 1400 may be implemented, at least in part, by a processor of another remote computer or a local circuit. In addition, one or more of the operations of the routine 1400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 15:
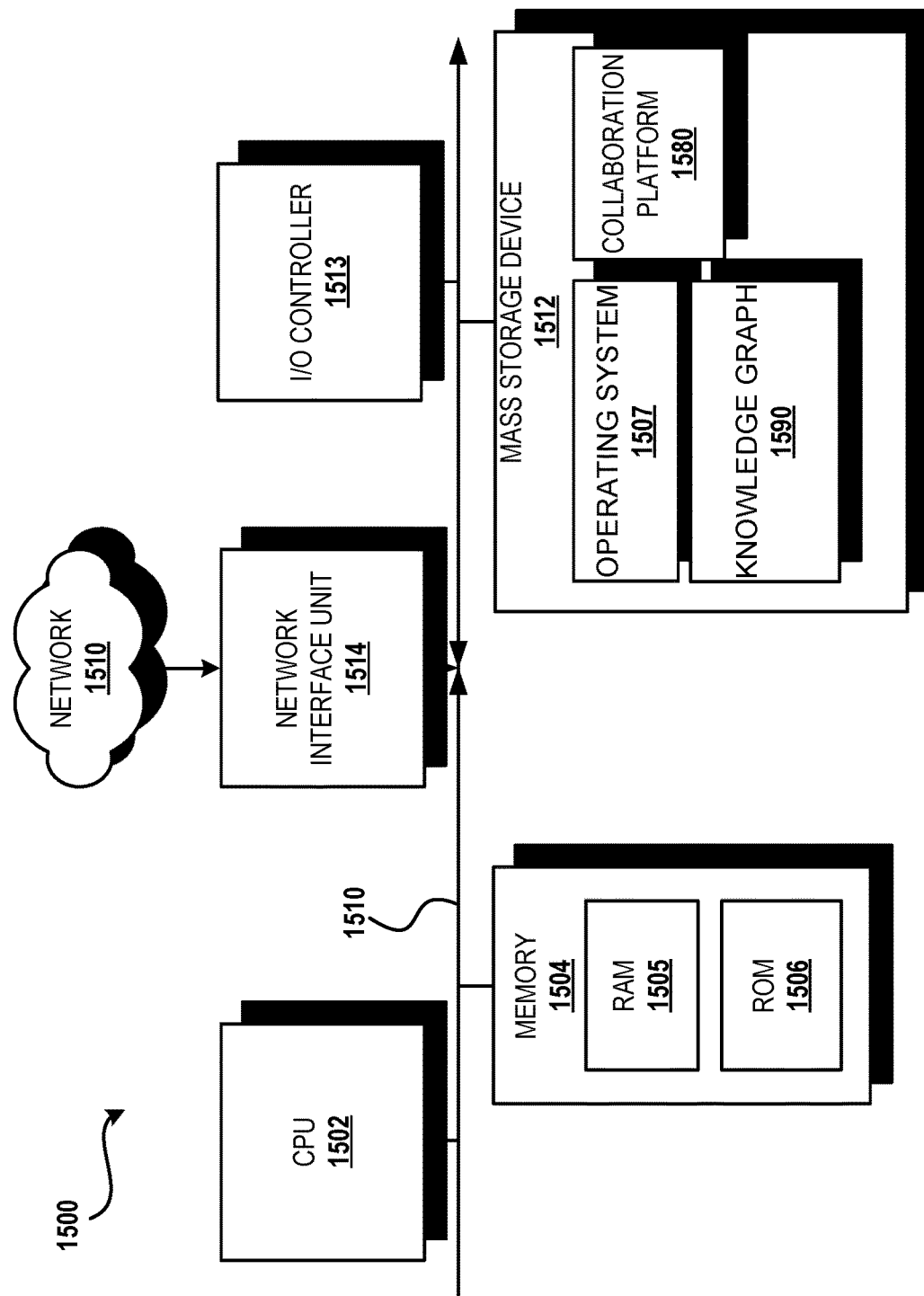
FIG. 15 is a schematic block diagram of an example computer device, in accordance with an implementation of the present disclosure.

The operations in FIG. 14 can be performed, for example, by the computing device 1500 of FIG. 15, as described above with respect to any one of FIGS. 1-13.

At operation 1401, a mining of a set of enterprise source documents is performed, by an enterprise named entity recognition (ENER) model, within an enterprise intranet to determine a plurality of entity names.

In an embodiment, the ENER model is trained in a multi-stage training process with public data enterprise data.

In an embodiment, the ENER model is trained in a multi-stage training process with non-public enterprise data.

At operation 1403, an entity record is generated within a knowledge graph for a mined entity name from the entity names based on an entity schema and ones of the set of enterprise source documents associated with the mined entity name.

In an embodiment, the entity record includes attributes aggregated from the ones of the set of enterprise source documents associated with the mined entity name.

At operation 1405, an entity page is displayed including at least a portion of the attributes of the entity record to a second user based on permissions of the second user to view the ones of the set of enterprise source documents associated with the mined entity name.

In an embodiment, the plurality of knowledge mining toolkits comprise a combination of a user-based mining system, Enterprise Named Entity Recognition (ENER) System, or a Bayesian inference based deep neural network model. In an embodiment, entities across the toolkits may be linked and conflated.

In an embodiment, the entity record includes metadata defining supporting enterprise source documents for each of the attributes of the entity record; and
the processor is configured to display respective ones of the portion of the attributes included in the entity page to the second user in response to determining that the second user has permission to access at least one of the enterprise source documents that supports the respective ones of the portion of the attributes.

In an embodiment, the entity record includes metadata defining supporting enterprise source documents for each of the attributes of the entity record and the processor is configured to perform the mining of the set of enterprise source documents by:

comparing the set of enterprise source documents to a set of templates defining potential entity attributes to identify instances within the set of enterprise source documents;
partitioning the instances by potential entity names into a plurality of partitions;
clustering the instances within each partition to identify the mined entity name for each partition; and
linking the mined entity name to existing entities in the knowledge graph.

In an embodiment, the entity record is a project entity record, wherein the processor is configured to:
filter common words from the instances; and
filter the plurality of entity names to remove at least one mined entity name where all of the clustered instances for the mined entity name are derived from templates that do not define a project name according to the entity schema.

In an embodiment, the plurality of entity names is linked with the knowledge graph, which includes linking across toolkits, as they can identify common entities.

In an embodiment, wherein the process is configured to filter entities that have a number of disconnected instances that exceeds a threshold.

In an embodiment, the curation action comprises creation of a topic page for the mined entity name, wherein the processor is configured to, in response to receiving the curation action from the first user:
determine whether a different topic page for the mined entity name has previously been created by another user; and
determine, based on access permissions of the first user, whether to allow access to the different topic page for the mined entity name.

In an embodiment, the entity record is a project entity record and the entity schema defines an identifier, a name, one or more members, one or more related groups or sites, and one or more related documents.

In an embodiment, the entity schema further defines one or more managers, one or more related emails, or one or more related meetings and the linking is further based on common users, and users working with common sites, hubs, and organizational hierarchy.

In an embodiment, the processor is further configured to:
identify a reference to the entity record within an enterprise document accessed by the second user; and
wherein to display the portion of the entity page further comprises to display an entity card including a portion of the entity page within an application used to access the enterprise document.

In another example, a mining of a set of enterprise source documents is performed, by an enterprise named entity recognition (ENER) model, within an enterprise intranet to determine a plurality of entity names. In an embodiment, the ENER model is trained in a multi-stage training process with public data and non-public enterprise data.

An entity record is generated within a knowledge graph for a mined entity name from the entity names based on an entity schema and ones of the set of enterprise source documents associated with the mined entity name. In an embodiment, the entity record includes attributes aggregated from the ones of the set of enterprise source documents associated with the mined entity name.

An entity page is displayed including at least a portion of the attributes of the entity record to a second user based on permissions of the second user to view the ones of the set of enterprise source documents associated with the mined entity name.

In an embodiment, the public data is Wikipedia data.

In an embodiment, the entity record includes metadata defining supporting enterprise source documents for each of the attributes of the entity record; and the processor is configured to display respective ones of the portion of the attributes included in the entity page to the second user in response to determining that the second user has permission to access at least one of the enterprise source documents that supports the respective ones of the portion of the attributes.

In an embodiment, the entity record includes metadata defining supporting enterprise source documents for each of the attributes of the entity record and the processor is configured to perform the mining of the set of enterprise source documents by:

comparing the set of enterprise source documents to a set of templates defining potential entity attributes to identify instances within the set of enterprise source documents;

partitioning the instances by potential entity names into a plurality of partitions; and clustering the instances within each partition to identify the mined entity name for each partition.

In an embodiment, the entity record is a project entity record, wherein the processor is configured to:

filter common words from the instances; and filter the plurality of entity names to remove at least one mined entity name where all of the clustered instances for the mined entity name are derived from templates that do not define a project name according to the entity schema.

In an embodiment, the entity record is a project entity record, wherein the process is configured to filter entities that have a number of disconnected instances that exceeds a threshold.

In an embodiment, the curation action comprises creation of a topic page for the mined entity name, wherein the processor is configured to, in response to receiving the curation action from the first user:

determine whether a different topic page for the mined entity name has previously been created by another user; and determine, based on access permissions of the first user, whether to allow access to the different topic page for the mined entity name.

In an embodiment, the entity record is a project entity record and the entity schema defines an identifier, a name, one or more members, one or more related groups or sites, and one or more related documents.

In an embodiment, the entity schema further defines one or more managers, one or more related emails, or one or more related meetings.

In an embodiment, the processor is further configured to:
identify a reference to the entity record within an enterprise document accessed by the second user; and wherein to display the portion of the entity page further comprises to display an entity card including a portion of the entity page within an application used to access the enterprise document.

In another example, a mining of a set of enterprise source documents is performed, by a user-based mining system, within an enterprise intranet to determine a plurality of entity names that are trending and active in the enterprise intranet based on enterprise users and enterprise user activity.

An entity record is generated within a knowledge graph for a mined entity name from the entity names based on an entity schema and ones of the set of enterprise source documents associated with the mined entity name. In an embodiment, the entity record includes attributes aggregated from the ones of the set of enterprise source documents associated with the mined entity name.

An entity page is displayed including at least a portion of the attributes of the entity record to a second user based on permissions of the second user to view the ones of the set of enterprise source documents associated with the mined entity name.

In an embodiment, the user-based mining system comprises a natural language based model.

In an embodiment, the entity record includes metadata defining supporting enterprise source documents for each of the attributes of the entity record; and the processor is configured to display respective ones of the portion of the attributes included in the entity page to the second user in response to determining that the second user has permission to access at least one of the enterprise source documents that supports the respective ones of the portion of the attributes.

In an embodiment, the enterprise user activity comprises at least one of meetings, emails, and documents.

In an embodiment, the enterprise user activity comprises one or more of how often a user discusses key phrases, whether the user is discussing the key phrases with known colleagues, documents authored by the user, and documents edited by the user.

In an embodiment, the processor is further configured to phase out stale topics based on an inactivity for a threshold period of time.

In an embodiment, the processor is configured to:
receive a curation action on the entity record from a first user associated with the entity record via the mining;
update the entity record based on the curation action.

In an embodiment, the entity record is a project entity record and the entity schema defines an identifier, a name, one or more members, one or more related groups or sites, and one or more related documents.

In an embodiment, the entity schema further defines one or more managers, one or more related emails, or one or more related meetings.

In an embodiment, the processor is further configured to:
phase out stale topics based on an inactivity for a threshold period of time.

In another example, mining of a set of enterprise source documents is performed, by a plurality of knowledge mining toolkits, within an enterprise intranet to determine a plurality of entity names.

A plurality of entity records are generated within a knowledge graph for mined entity names from the entity names based on an entity schema and ones of the set of enterprise source documents associated with the mined entity names. In an embodiment, the entity records include attributes aggregated from the ones of the set of enterprise source documents associated with the mined entity names.

Pattern recognition is applied to an active document using an enterprise named entity recognition (ENER) system to identify potential entity names within the document that match a respective one of a plurality of entity records in the knowledge graph.

One or more matching entity names are annotated within the document with information from the knowledge graph for the respective ones of the plurality of entity records.

The annotated information is displayed with the active document.

In an embodiment, the plurality of knowledge mining toolkits comprise a combination of a user-based mining system, Enterprise Named Entity Recognition (ENER) System, or a Bayesian inference based deep neural network model.

In an embodiment, a curation action is received on one of the entity records from a first user associated with the entity record via the mining; and the one entity record is updated based on the curation action.

In an embodiment, a new curated entity record is created and the curated entity record is linked to an existing mined entity.

In an embodiment, a new curated entity record is created and without linking the curated entity record to an existing mined entity.

In an embodiment, curated entity records are associated with an access control list.

In an embodiment, the curation action comprises creation of a topic page for the mined entity name, wherein the processor is configured to, in response to receiving the curation action from the first user:

determine whether a different topic page for the mined entity name has previously been created by another user; and determine, based on access permissions of the first user, whether to allow access to the different topic page for the mined entity name.

In an embodiment, the entity record is a project entity record and the entity schema defines an identifier, a name, one or more members, one or more related groups or sites, and one or more related documents.

In an embodiment, the active document is one of a document, web pages, or email.

In an embodiment, a reference to the entity record is identified within an enterprise document accessed by the second user; and an entity card is displayed including a portion of the entity page within an application used to access the enterprise document.

In another example, a mining of a set of enterprise source documents is performed, by an enterprise named entity recognition (ENER) model, within an enterprise intranet to determine a plurality of entity names. In an embodiment, the ENER model is trained in a multi-stage training process with public data and non-public enterprise data.

An entity record is generated within a knowledge graph for a mined entity name from the entity names based on an entity schema and ones of the set of enterprise source documents associated with the mined entity name. In an embodiment, the entity record includes attributes aggregated from the ones of the set of enterprise source documents associated with the mined entity name.

An entity page is displayed including at least a portion of the attributes of the entity record to a second user based on permissions of the second user to view the ones of the set of enterprise source documents associated with the mined entity name.

In an embodiment, the public data is Wikipedia data.

In an embodiment, the entity record includes metadata defining supporting enterprise source documents for each of the attributes of the entity record; and the processor is configured to display respective ones of the portion of the attributes included in the entity page to the second user in response to determining that the second user has permission to access at least one of the enterprise source documents that supports the respective ones of the portion of the attributes.

In an embodiment, the entity record includes metadata defining supporting enterprise source documents for each of the attributes of the entity record and the processor is configured to perform the mining of the set of enterprise source documents by:

comparing the set of enterprise source documents to a set of templates defining potential entity attributes to identify instances within the set of enterprise source documents;

partitioning the instances by potential entity names into a plurality of partitions; and clustering the instances within each partition to identify the mined entity name for each partition.

In an embodiment, the entity record is a project entity record, wherein the processor is configured to:

filter common words from the instances; and filter the plurality of entity names to remove at least one mined entity name where all of the clustered instances for the mined entity name are derived from templates that do not define a project name according to the entity schema.

In an embodiment, the entity record is a project entity record, wherein the process is configured to filter entities that have a number of disconnected instances that exceeds a threshold.

In an embodiment, the curation action comprises creation of a topic page for the mined entity name, wherein the processor is configured to, in response to receiving the curation action from the first user:

determine whether a different topic page for the mined entity name has previously been created by another user; and determine, based on access permissions of the first user, whether to allow access to the different topic page for the mined entity name.

In an embodiment, the entity record is a project entity record and the entity schema defines an identifier, a name, one or more members, one or more related groups or sites, and one or more related documents.

In an embodiment, the entity schema further defines one or more managers, one or more related emails, or one or more related meetings.

In an embodiment, the processor is further configured to:

identify a reference to the entity record within an enterprise document accessed by the second user; and wherein to display the portion of the entity page further comprises to display an entity card including a portion of the entity page within an application used to access the enterprise document.

FIG. 15 shows additional details of an example computer architecture 1500 for a computer, such as a computing device executing computing platform 110, capable of executing the program components described herein. Thus, the computer architecture 1500 illustrated in FIG. 15 illustrates an architecture for a server computer, a mobile phone, a PDA, a smart phone, a desktop computer, a netbook computer, a tablet computer, and/or a laptop computer. The computer architecture 1500 may be utilized to execute any aspects of the software components presented herein.

The computer architecture 1500 illustrated in FIG. 15 includes a central processing unit 1502 ("CPU"), a system memory 1504, including a random access memory 15015 ("RAM") and a read-only memory ("ROM") 15015, and a system bus 1510 that couples the memory 1504 to the CPU 1502. A basic input/output system containing the basic routines that help to transfer information between elements within the computer architecture 1500, such as during startup, is stored in the ROM 1506. The computer architecture 1500 further includes a mass storage device 1512 for storing an operating system 1507. Mass storage device 1512 may further include knowledge graph functionality 1590 and collaboration platform 1580, which include some or all of the aspects of functionality as disclosed herein.

The mass storage device 1512 is connected to the CPU 1502 through a mass storage controller (not shown) connected to the bus 1510. The mass storage device 1512 and its associated computer-readable media provide non-volatile storage for the computer architecture 1500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1500. For purposes of the claims, the phrase "computer storage medium," "computer-readable storage medium" and variations thereof, does not include waves, signals, and/or other transitory and/or intangible communication media, per se.

According to various configurations, the computer architecture 1500 may operate in a networked environment using logical connections to remote computers through the network 1510 and/or another network (not shown). The computer architecture 1500 may connect to the network 1510 through a network interface unit 1514 connected to the bus 1510. It should be appreciated that the network interface unit 1514 also may be utilized to connect to other types of networks and remote computer systems. The computer architecture 1500 also may include an input/output controller 1513 for receiving and processing input from a number of other devices, including a keyboard, mouse, or electronic stylus (not shown in FIG. 15). Similarly, the input/output controller 1513 may provide output to a display screen, a printer, or other type of output device (also not shown in FIG. 15).

It should be appreciated that the software components described herein may, when loaded into the CPU 1502 and executed, transform the CPU 1502 and the overall computer architecture 1500 from a general-purpose computing system into a special-purpose computing system customized to facilitate the functionality presented herein. The CPU 1502 may be constructed from any number of transistors or other discrete circuit elements, which may individually or collectively assume any number of states. More specifically, the CPU 1502 may operate as a finite-state machine, in response to executable instructions contained within the software modules disclosed herein. These computer-executable instructions may transform the CPU 1502 by specifying how the CPU 1502 transitions between states, thereby transforming the transistors or other discrete hardware elements constituting the CPU 1502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, and/or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1500 in order to store and execute the software components presented herein. It also should be appreciated that the computer architecture 1500 may include other types of computing devices, including hand-held computers, embedded computer systems, personal digital assistants, and other types of computing devices known to those skilled in the art. It is also contemplated that the computer architecture 1500 may not include all of the components shown in FIG. 15, may include other components that are not explicitly shown in FIG. 15, or may utilize an architecture completely different than that shown in FIG. 15.

Figure 16:
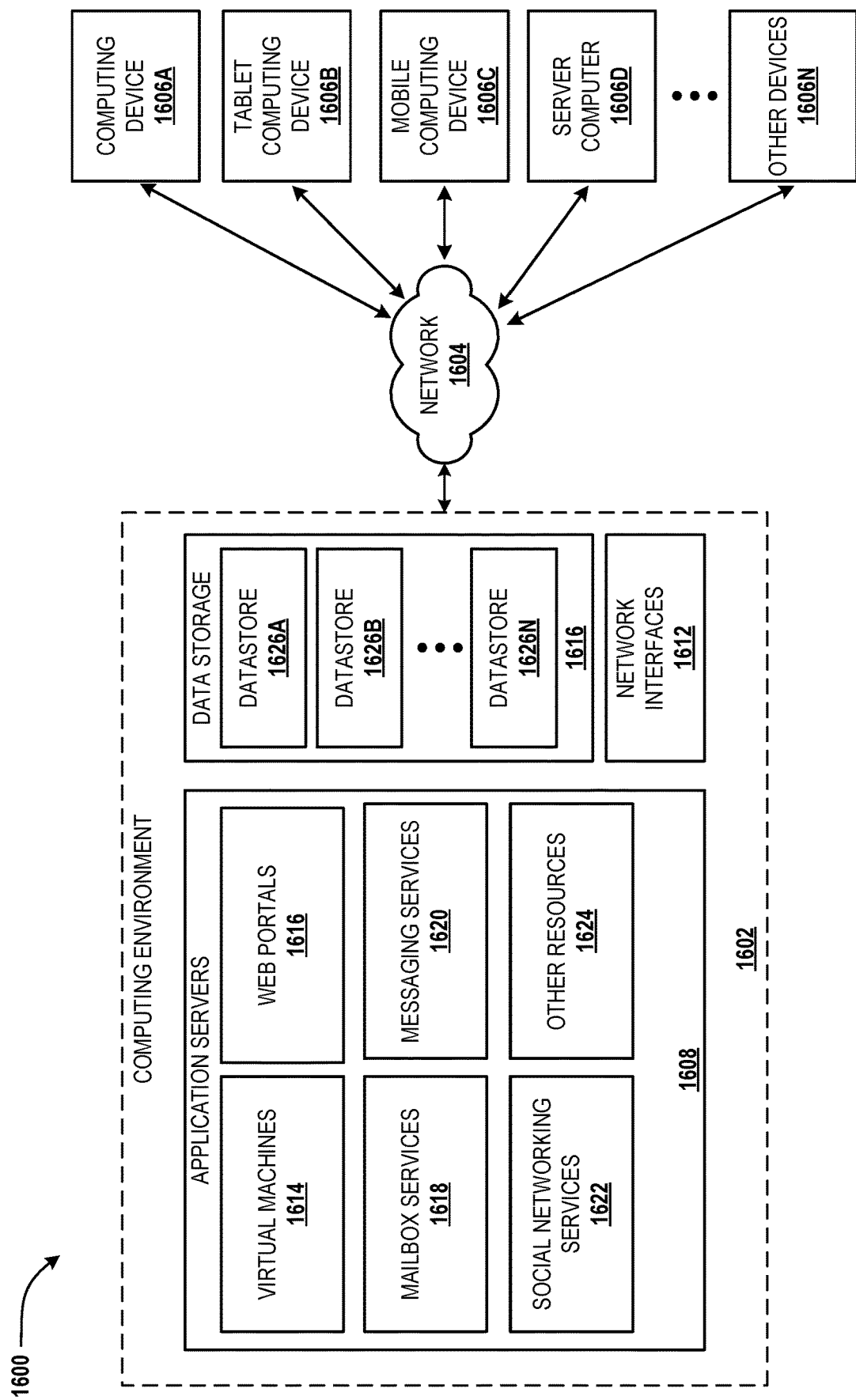
FIG. 16 is a computer architecture diagram illustrating an illustrative computer hardware and software architecture for a computing system capable of implementing aspects of the techniques and technologies presented herein.

FIG. 16 depicts an illustrative distributed computing environment 1600 capable of executing the software components described herein. Thus, the distributed computing environment 1600 illustrated in FIG. 16 can be utilized to execute any aspects of the software components presented herein. For example, the distributed computing environment 1600 can be utilized to execute aspects of the software components described herein.

According to various implementations, the distributed computing environment 1600 includes a computing environment 1602 operating on, in communication with, or as part of the network 1604. The network 1604 may be or may include the network 916, described above with reference to FIG. 9. The network 1604 also can include various access networks. One or more client devices 1606A-1606N (hereinafter referred to collectively and/or generically as "clients 1606" and also referred to herein as computing devices 166) can communicate with the computing environment 1602 via the network 1604 and/or other connections (not illustrated in FIG. 16). In one illustrated configuration, the clients 1606 include a computing device 1606A such as a laptop computer, a desktop computer, or other computing device; a slate or tablet computing device ("tablet computing device") 1606B; a mobile computing device 1606C such as a mobile telephone, a smart phone, or other mobile computing device; a server computer 1606D; and/or other devices 1606N. It should be understood that any number of clients 1606 can communicate with the computing environment 1602. Two example computing architectures for the clients 1606 are illustrated and described herein with reference to FIGS. 9 and 16. It should be understood that the illustrated clients 1606 and computing architectures illustrated and described herein are illustrative, and should not be construed as being limiting in any way.

In the illustrated configuration, the computing environment 1602 includes application servers 1608, data storage 1616, and one or more network interfaces 1612. According to various implementations, the functionality of the application servers 1608 can be provided by one or more server computers that are executing as part of, or in communication with, the network 1604. The application servers 1608 can host various services, virtual machines, portals, and/or other resources. In the illustrated configuration, the application servers 1608 host one or more virtual machines 1614 for hosting applications or other functionality. According to various implementations, the virtual machines 1614 host one or more applications and/or software modules for enabling in-application support for topological changes to files during remote synchronization. It should be understood that this configuration is illustrative, and should not be construed as being limiting in any way. The application servers 1608 also host or provide access to one or more portals, link pages, Web sites, and/or other information ("Web portals") 1616.

According to various implementations, the application servers 1608 also include one or more mailbox services 1618 and one or more messaging services 1620. The mailbox services 1618 can include electronic mail ("email") services. The mailbox services 1618 also can include various personal information management ("PIM") and presence services including, but not limited to, calendar services, contact management services, collaboration services, and/or other services. The messaging services 1620 can include, but are not limited to, instant messaging services, chat services, forum services, and/or other communication services.

The application servers 1608 also may include one or more social networking services 1622. The social networking services 1622 can include various social networking services including, but not limited to, services for sharing or posting status updates, instant messages, links, photos, videos, and/or other information; services for commenting or displaying interest in articles, products, blogs, or other resources; and/or other services. In other configurations, the social networking services 1622 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Washington Other services are possible and are contemplated.

The social networking services 1622 also can include commenting, blogging, and/or micro blogging services. It should be appreciated that the above lists of services are not exhaustive and that numerous additional and/or alternative social networking services 1622 are not mentioned herein for the sake of brevity. As such, the above configurations are illustrative, and should not be construed as being limited in any way. According to various implementations, the social networking services 1622 may host one or more applications and/or software modules for providing the functionality described herein, such as enabling in-application support for topological changes to files during remote synchronization. For instance, any one of the application servers 1608 may communicate or facilitate the functionality and features described herein. For instance, a social networking application, mail client, messaging client or a browser running on a phone or any other client 1606 may communicate with a networking service 1622 and facilitate the functionality, even in part, described above with respect to FIG. 16. Any device or service depicted herein can be used as a resource for supplemental data, including email servers, storage servers, etc.

As shown in FIG. 16, the application servers 1608 also can host other services, applications, portals, and/or other resources ("other resources") 1624. The other resources 1624 can include, but are not limited to, document sharing, rendering or any other functionality. It thus can be appreciated that the computing environment 1602 can provide integration of the concepts and technologies disclosed herein with various mailbox, messaging, social networking, and/or other services or resources.

As mentioned above, the computing environment 1602 can include the data storage 1616. According to various implementations, the functionality of the data storage 1616 is provided by one or more databases operating on, or in communication with, the network 1604. The functionality of the data storage 1616 also can be provided by one or more server computers configured to host data for the computing environment 1602. The data storage 1616 can include, host, or provide one or more real or virtual datastores 1626A-1626N (hereinafter referred to collectively and/or generically as "datastores 1626"). The datastores 1626 are configured to host data used or created by the application servers 1608 and/or other data. Although not illustrated in FIG. 16, the datastores 1626 also can host or store web page documents, word documents, presentation documents, data structures, algorithms for execution by a recommendation engine, and/or other data utilized by any application program or another module. Aspects of the datastores 1626 may be associated with a service for storing files.

The computing environment 1602 can communicate with, or be accessed by, the network interfaces 1612. The network interfaces 1612 can include various types of network hardware and software for supporting communications between two or more computing devices including, but not limited to, the computing devices and the servers. It should be appreciated that the network interfaces 1612 also may be utilized to connect to other types of networks and/or computer systems.

It should be understood that the distributed computing environment 1600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1600 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1600 to utilize the functionality described herein for providing the techniques disclosed herein, among other aspects. In one specific example, as summarized above, techniques described herein may be implemented, at least in part, by a web browser application, which works in conjunction with the application servers 1608 of FIG. 16.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer system comprising:
a memory storing computer-executable instructions;
a processor configured to execute the instructions to:
perform, by an enterprise named entity recognition (ENER) model, a mining of a set of enterprise source documents within an enterprise intranet to determine a plurality of entity names, wherein the ENER model is trained in a multi-stage training process with public data and non-public enterprise data, the multi-stage training process comprising:
in a first stage, training the ENER model using the public data, the public data comprising named entity recognition training data converted from an online reference encyclopedia using a structured knowledge graph;
in a second stage, tuning the ENER model using collected data from enterprise documents from the non-public enterprise data and NER training corpora from academic research; and
filtering entities that have a number of disconnected instances of potential entity attributes indicative of duplication that exceeds a threshold;
generate an entity record within a knowledge graph for a mined entity name from the entity names based on an entity schema and ones of the set of enterprise source documents associated with the mined entity name, the entity record including attributes aggregated from the ones of the set of enterprise source documents associated with the mined entity name, wherein the entity record is a project entity record and includes metadata defining supporting enterprise source documents for each of the attributes of the entity record and the mining of the set of enterprise source documents comprises:

comparing the set of enterprise source documents to a set of templates defining potential entity attributes to identify instances within the set of enterprise source documents;
partitioning the instances by potential entity names into a plurality of partitions; and
clustering the instances within each partition to identify the mined entity name for each partition;
filter common words from the instances;
filter the plurality of entity names to remove at least one mined entity name where all of the clustered instances for the mined entity name are derived from templates that do not define a project name according to the entity schema; and
display an entity page including at least a portion of the attributes of the entity record based on permissions to view the ones of the set of enterprise source documents associated with the mined entity name.

2. The computer system of claim 1, wherein the public data is Wikipedia data.

3. The computer system of claim 1, wherein:
the entity record includes metadata defining supporting enterprise source documents for each of the attributes of the entity record; and
the processor is configured to display respective ones of the portion of the attributes included in the entity page in response to determining that a user has permission to access at least one of the enterprise source documents that supports the respective ones of the portion of the attributes.

4. The computer system of claim 1, wherein the processor is configured to:
receive a curation action on the entity record from a first user associated with the entity record via the mining;
update the entity record based on the curation action.

5. The computer system of claim 1 wherein the entity record is a project entity record and the entity schema defines an identifier, a name, one or more members, one or more related groups or sites, and one or more related documents.

6. The computer system of claim 5, wherein the entity schema further defines one or more managers, one or more related emails, or one or more related meetings.

7. The computer system of claim 1, wherein the processor is further configured to:
identify a reference to the entity record within an enterprise document accessed by a user; and
wherein to display the portion of the entity page further comprises to display an entity card including a portion of the entity page within an application used to access the enterprise document.

8. A method of managing an entity record within a knowledge graph, comprising
performing, by an enterprise named entity recognition (ENER) model, a mining of a set of enterprise source documents within an enterprise intranet to determine a plurality of entity names, wherein the ENER model is trained in a multi-stage training process with public data and non-public enterprise data, the multi-stage training process comprising:
in a first stage, training the ENER model using the public data, the public data comprising named entity recognition training data converted from an online reference encyclopedia using a structured knowledge graph;
in a second stage, tuning the ENER model using collected data from enterprise documents from the non-public enterprise data and NER training corpora from academic research; and
filtering entities that have a number of disconnected instances of potential entity attributes indicative of duplication that exceeds a threshold;
generating an entity record within a knowledge graph for a mined entity name from the entity names based on an entity schema and ones of the set of enterprise source documents associated with the mined entity name, the entity record including attributes aggregated from the ones of the set of enterprise source documents associated with the mined entity name, wherein the entity record is a project entity record and includes metadata defining supporting enterprise source documents for each of the attributes of the entity record and the mining of the set of enterprise source documents comprises:
comparing the set of enterprise source documents to a set of templates defining potential entity attributes to identify instances within the set of enterprise source documents;
partitioning the instances by potential entity names into a plurality of partitions; and
clustering the instances within each partition to identify the mined entity name for each partition;
filter common words from the instances;
filter the plurality of entity names to remove at least one mined entity name where all of the clustered instances for the mined entity name are derived from templates that do not define a project name according to the entity schema; and
displaying an entity page including at least a portion of the attributes of the entity record based on permissions to view the ones of the set of enterprise source documents associated with the mined entity name.

9. The method of claim 8, wherein the entity record includes metadata defining supporting enterprise source documents for each of the attributes of the entity record, and wherein displaying the entity page comprises displaying respective ones of the portion of the attributes included in the entity page in response to determining that a user has permission to access at least one of the supporting enterprise source documents that supports the respective ones of the portion of the attributes.

10. The method of claim 8, wherein the public data is Wikipedia data.

11. The method of claim 8, further comprising identifying a reference to the entity record within an enterprise document accessed by a user; and wherein displaying the portion of the entity page comprises displaying an entity card including a portion of the entity page within an application used to access the enterprise document.

12. A non-transitory computer-readable medium storing computer-executable instructions that when executed by a computer processor cause the computer processor to:
performing, by an enterprise named entity recognition (ENER) model, a mining of a set of enterprise source documents within an enterprise intranet to determine a plurality of entity names, wherein the ENER model is trained in a multi-stage training process with public data and non-public enterprise data, the multi-stage training process comprising:
in a first stage, training the ENER model using the public data, the public data comprising named entity recognition training data converted from an online reference encyclopedia using a structured knowledge graph;

in a second stage, tuning the ENER model using collected data from enterprise documents from the non-public enterprise data and NER training corpora from academic research; and filtering entities that have a number of disconnected instances of potential entity attributes indicative of duplication that exceeds a threshold;

generating an entity record within a knowledge graph for a mined entity name from the entity names based on an entity schema and ones of the set of enterprise source documents associated with the mined entity name, the entity record including attributes aggregated from the ones of the set of enterprise source documents associated with the mined entity name, wherein the entity record is a project entity record and includes metadata defining supporting enterprise source documents for each of the attributes of the entity record and the mining of the set of enterprise source documents comprises:

comparing the set of enterprise source documents to a set of templates defining potential entity attributes to identify instances within the set of enterprise source documents;

partitioning the instances by potential entity names into a plurality of partitions; and clustering the instances within each partition to identify the mined entity name for each partition;

filter common words from the instances;

filter the plurality of entity names to remove at least one mined entity name where all of the clustered instances for the mined entity name are derived from templates that do not define a project name according to the entity schema; and displaying an entity page including at least a portion of the attributes of the entity record based on permissions to view the ones of the set of enterprise source documents associated with the mined entity name.

13. The non-transitory computer-readable medium of claim 12, wherein the public data is Wikipedia data.

14. The non-transitory computer-readable medium of claim 13, wherein the entity record includes metadata defining supporting enterprise source documents for each of the attributes of the entity record, further comprising instructions to display respective ones of the portion of the attributes included in the entity page in response to determining that a user has permission to access at least one of the enterprise source documents that supports the respective ones of the portion of the attributes.

* * * * *